US012562630B2

(12) United States Patent
Mellere

(10) Patent No.: US 12,562,630 B2
(45) Date of Patent: Feb. 24, 2026

(54) ELECTRIC ACTUATOR

(71) Applicant: Sonceboz Mechatronics Boncourt SA, Boncourt (CH)

(72) Inventor: Cédric Mellere, Boncourt (CH)

(73) Assignee: Sonceboz Mechatronics Boncourt SA, Boncourt (CH)

( * ) Notice: Subject to any disclaimer, the term of this patent is extended or adjusted under 35 U.S.C. 154(b) by 587 days.

(21) Appl. No.: 17/280,378

(22) PCT Filed: Sep. 30, 2019

(86) PCT No.: PCT/EP2019/076384
§ 371 (c)(1),
(2) Date: Mar. 26, 2021

(87) PCT Pub. No.: WO2020/065088
PCT Pub. Date: Apr. 2, 2020

(65) Prior Publication Data
US 2021/0351682 A1 Nov. 11, 2021

(30) Foreign Application Priority Data
Sep. 28, 2018 (FR) ...................................... 1858987

(51) Int. Cl.
*H02K 37/24* (2006.01)
*H02K 5/22* (2006.01)
(Continued)

(52) U.S. Cl.
CPC ............. *H02K 37/24* (2013.01); *H02K 5/225* (2013.01); *H02K 7/083* (2013.01); *H02K 7/116* (2013.01);
(Continued)

(58) Field of Classification Search
CPC ............ H02K 5/225; H02K 5/24; H02K 5/26; H02K 5/10; H02K 5/04; H02K 7/116; H02K 7/083; F16H 57/021
See application file for complete search history.

(56) References Cited

U.S. PATENT DOCUMENTS 2,301,170 A * 11/1942 Miner, Jr. ................ H02K 5/26
248/665
5,237,231 A * 8/1993 Blaettner ................. H02K 1/17
310/219
(Continued)

FOREIGN PATENT DOCUMENTS

CN 203660685 6/2014
DE 4313782 C2 9/1997
(Continued)

OTHER PUBLICATIONS

WO2018088356A1_Translation (Year: 2023).*
(Continued)

*Primary Examiner* — Christopher M Koehler
*Assistant Examiner* — Ahmed F Seck
(74) *Attorney, Agent, or Firm* — TraskBritt

(57) ABSTRACT

An electric actuator comprises a housing, an electric motor comprising a wound stator and a rotor mounted on a shaft, a printed circuit for powering the stator, an intermediate plate, a mechanical reduction gear driven by the rotor and comprising toothed wheels mounted on axes, a cover and two centering pins. The motor is housed in a cavity of the housing, which guides one end of the shaft. The printed circuit is located above the stator. The intermediate plate is located above the circuit. The cover is located above the intermediate plate. The reduction gear is housed in a cavity of the cover, which guides one end of each axis. The intermediate plate guides the other end of the shaft and of the axes. Three pairs of centering holes receive the centering (Continued)

pins. The housing comprises a single sealing gasket positioned at the interface between the housing and the cover.

15 Claims, 20 Drawing Sheets

(51) Int. Cl.

| | | |
|---|---|---|
| *H02K 7/08* | (2006.01) | |
| *H02K 7/116* | (2006.01) | |
| *H02K 11/215* | (2016.01) | |
| *H02K 11/33* | (2016.01) | |
| *H02K 37/14* | (2006.01) | |

(52) U.S. Cl.
CPC ........... *H02K 11/215* (2016.01); *H02K 11/33* (2016.01); *H02K 37/14* (2013.01); *H02K 2211/03* (2013.01)

(56) References Cited

U.S. PATENT DOCUMENTS

| | | | | |
|---|---|---|---|---|
| 2005/0189828 A1* | 9/2005 | Nakayama | ............. | H02K 11/00 |
| | | | | 310/71 |
| 2010/0301691 A1* | 12/2010 | Cors | ..................... | H02K 7/086 |
| | | | | 310/83 |
| 2011/0031824 A1 | 2/2011 | Prudham | | |
| 2015/0263572 A1 | 9/2015 | Hyppias et al. | | |
| 2016/0072362 A1* | 3/2016 | Kube | ..................... | H02K 7/116 |
| | | | | 310/67 R |
| 2016/0248292 A1* | 8/2016 | Takarai | ..................... | H02K 5/08 |
| 2018/0062479 A1 | 3/2018 | Stewart et al. | | |

FOREIGN PATENT DOCUMENTS

| | | | | | |
|---|---|---|---|---|---|
| FR | 2919441 A1 | | 1/2009 | | |
| FR | 2994353 A1 | | 2/2014 | | |
| JP | 2014103824 A | * | 6/2014 | ............... | H02K 1/16 |
| WO | WO2010138455 A2 | * | 12/2010 | | |
| WO | WO2018069628 A1 | * | 4/2018 | ............. | H01R 39/38 |
| WO | WO2018088356 A1 | * | 5/2018 | ............. | H02K 7/116 |
| WO | WO 2018149658 A1 | * | 8/2018 | ............. | H01F 17/04 |

OTHER PUBLICATIONS

WO2010138455A2_Translation (Year: 2023).*
WO2018069628A1_Translation (Year: 2023).*
WO 2018149658 A1_Translation (Year: 2023).*
JP 2014103824 A_Translation (Year: 2023).*
International Search Report for International Application No. PCT/EP2019/076384 dated Dec. 12, 2019, 2 pages.
International Written Opinion for International Application No. PCT/EP2019/076384 dated Dec. 12, 2019, 6 pages.
Chinese First Office Action for Application No. 201980063934.0 dated Mar. 28, 2024, 6 pages.

* cited by examiner

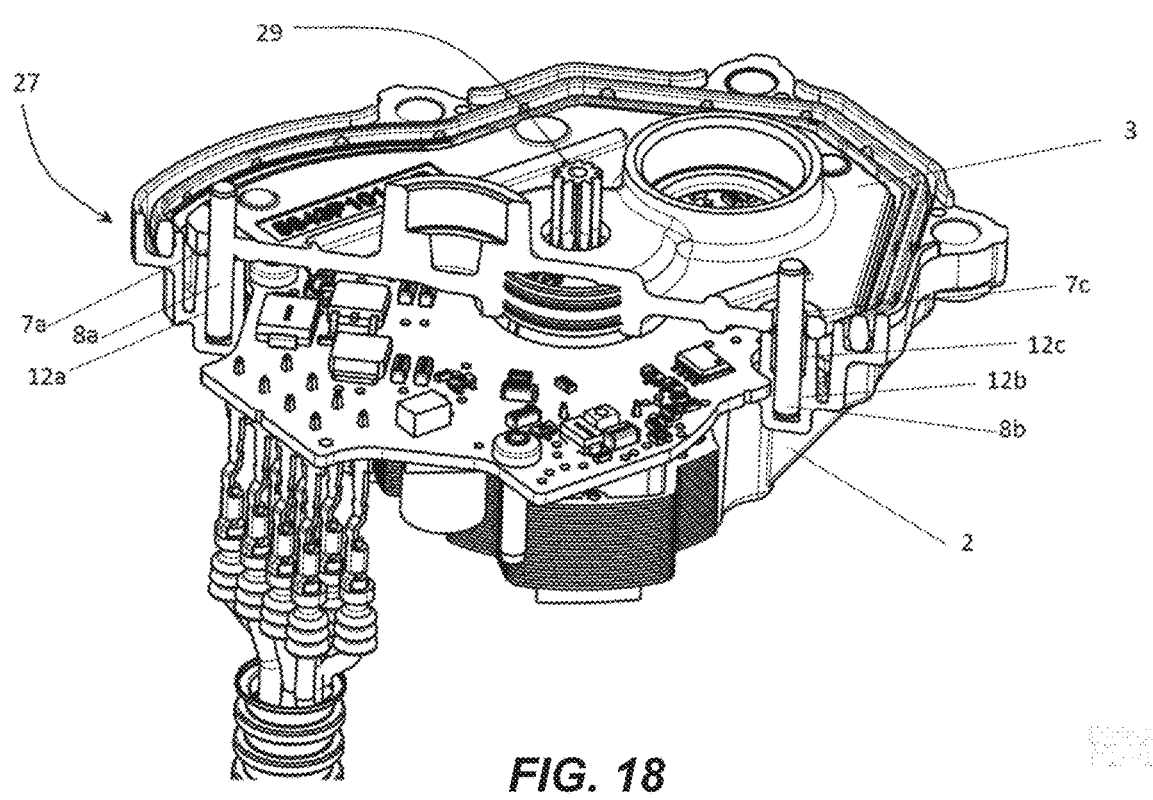
FIG. 18
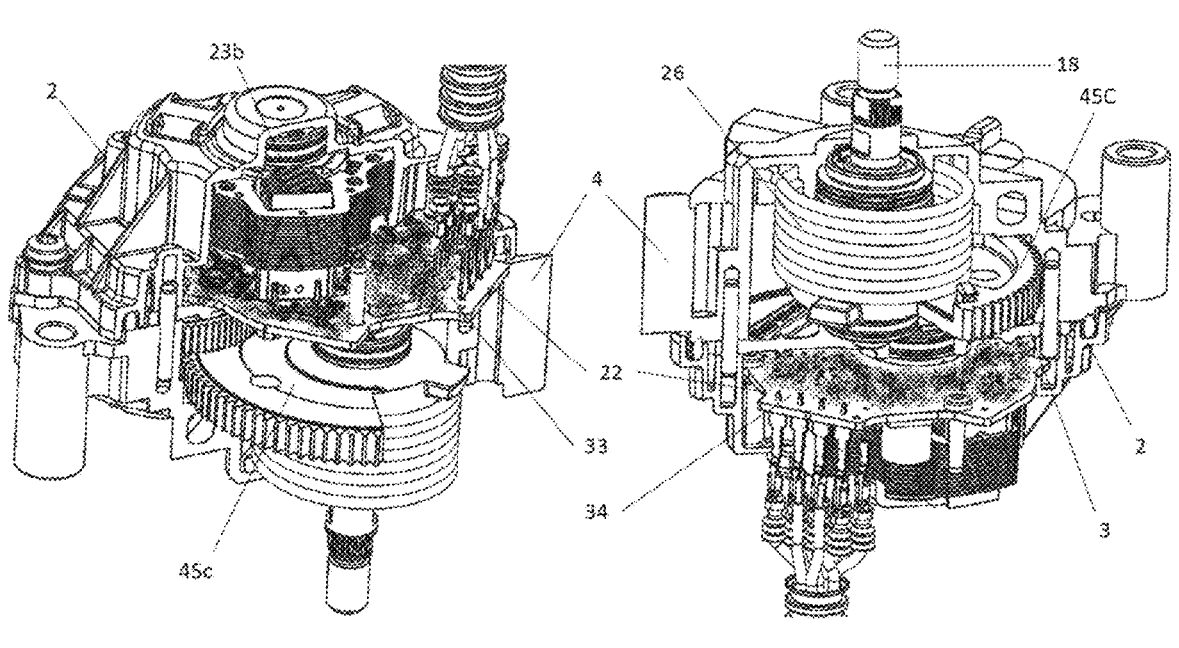
FIG. 19a                    FIG. 19b

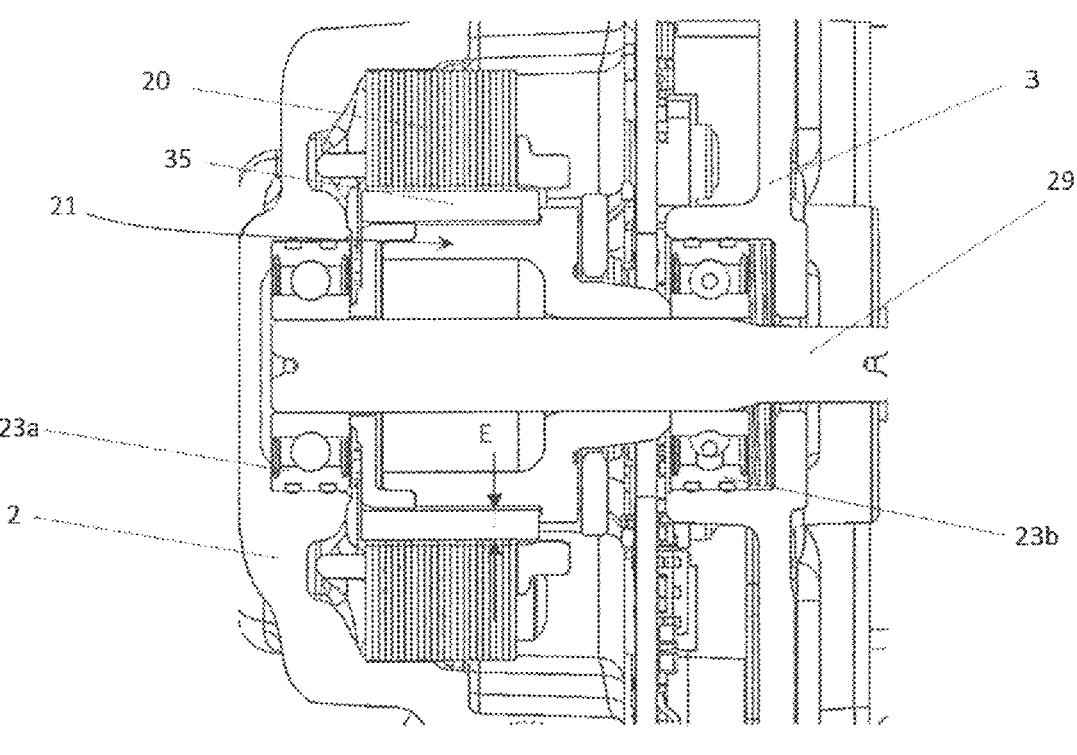
Fig. 20
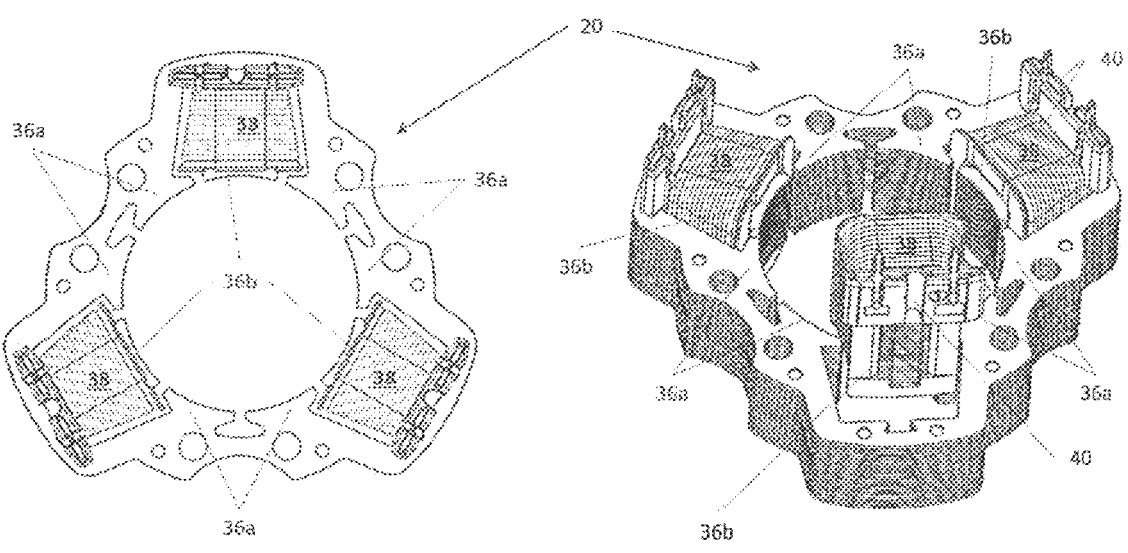
Fig. 21                 Fig. 22

ELECTRIC ACTUATOR

CROSS-REFERENCE TO RELATED APPLICATIONS

This application is a national phase entry under 35 U.S.C. § 371 of International Patent Application PCT/EP2019/076384, filed Sep. 30, 2019, designating the United States of America and published as International Patent Publication WO 2020/065088 A1 on Apr. 2, 2020, which claims the benefit under Article 8 of the Patent Cooperation Treaty to French Patent Application Serial No. 1858987, filed Sep. 28, 2018.

TECHNICAL FIELD

The present disclosure relates to the field of electric actuators comprising the assembly, in a housing and a cover, of an electric motor, a printed circuit carrying the electronic control components and a mechanical reduction gear.

BACKGROUND

Numerous electric actuators are already known in the state of the art. For example, publication WO2018/088356 describes an actuator, which has: a housing, which has a motor case and a gear case each having an opening on one side and in which the motor case and the gear case are assembled to each other so that the respective openings face each other; a motor that is installed in the motor case; a gear that is installed in the gear case and which is arranged to transmit the rotation of the motor. The housing has a partition wall that is disposed between the motor and the gear. The gear is rotatably supported on both sides in the gear shaft direction by the gear case and the partition wall.

According to this solution, the case comprises a first and a second motor case open on one side, and a central case disposed between these two cases. The housing sandwiches the central case between the motor case and the gear case.

This solution involves providing a double seal, on the one hand between the central case and the first motor case, and on the other hand between the gear case and the central case.

Also known are patent applications US2018/062479, DE4313782 and WO2010/138455 describe constructions of actuators comprising a printed circuit positioned between an electric motor and a mechanical reduction gear.

Although these embodiments are compact and capable of producing high torques, they lack the robustness to provide sufficient vibration resistance and service life performance. Indeed, endurance performance requires an alignment, a precise and controlled centering of the guide elements of the mechanical reduction gear as well as an efficient management of the evacuation of the thermal energy produced at the electronic components and the motor. The embodiments claimed in these documents do not provide any solution for robust control of the precise guidance of the reduction gear (imperfect guidance because it is only present on one side of the wheels forming this reduction gear, favoring detrimental overhangs, absence of precise centering between the housing and the cover forming the upper and lower guide elements of the reduction gear, promoting coaxiality and parallelism defects). These embodiments also provide no solution for dissipating thermal energy, since the electronic components present on the printed circuit have no thermal bridge to the outside to dissipate the thermal energy that they produce, favoring detrimental heating. This results in solutions that are not very mechanically robust and that are incapable of addressing applications with a high ambient operating temperature and/or a high operating load.

There are solutions that solve the drawbacks mentioned above, as, for example, described in document WO2010138455, owing to the use of an intermediate plate located between the electric motor with its printed circuit on the one hand and the mechanical reduction gear on the other hand.

This solution makes it possible to resume guiding the shafts of the mechanical reduction gear and also allows improved heat dissipation at the printed circuit due to its proximity to the latter. This solution also offers a liquid cooling circuit that circulates in the peripheral proximity of the motor for better thermal energy evacuation.

However, the implementation of this intermediate plate is not easy: on the one hand it has a rigid support on the cover but it rests on the housing side on the printed circuit, which is not very rigid, and on the other hand it does not incorporate any centering element allowing adequate guidance of the three housing, cover and intermediate plate elements. In addition, the document cited above does not provide a solution to the hyperstatic mechanical situation resulting from this bilateral support and the need to close the actuator in a sealed manner.

BRIEF SUMMARY

The object of the present disclosure is to improve current solutions, in particular, by proposing an effective industrial solution allowing the viable centering and guiding of the three elements mentioned above.

Another object of the present disclosure is to provide a solution to the hyperstatic assembly described above, favoring the robustness of the assembly of the actuator.

Another object of the present disclosure is to improve the thermal behavior of the actuator, allowing its use in environments heated to high temperatures (typically greater than 150° C.).

More particularly, the present disclosure relates to an electric actuator comprising a housing, an electric motor comprising a wound stator and a rotor mounted on a rotor shaft, a printed circuit for powering the stator and controlling the motor, an intermediate plate, a mechanical reduction gear driven by the rotor and formed by toothed wheels mounted on axes, a cover, two centering pins, the housing defining a first cavity in which the stator is housed, the housing serving to guide the rotor shaft on a first end, the printed circuit being housed in the first cavity above the stator, the intermediate plate being situated above the printed circuit, the cover defining a second cavity provided with means for guiding one end of the axes of the mechanical reduction gear and being located above the intermediate plate, the intermediate plate having guide means for guiding the other end of the rotor shaft, and serving to guide the other ends of the axes of the mechanical reduction gear, characterized in that in the first cavity of the housing there is a first pair of centering holes receiving the two centering pins, in the intermediate plate there is a second pair of centering holes receiving the two centering pins, in the cover there is a third pair of centering holes receiving the two centering pins, the intermediate plate is in contact with the housing and the cover on support surfaces located around the centering holes, two of the first, second and third pairs of holes are composed of a cylindrical centering device and a clear centering device, the cylindrical centering devices and the corresponding clear centering devices, the other of the first, second and third pairs of holes is composed of two cylindrical centering devices, the housing comprising a single sealing gasket positioned at the interface between the housing and the cover.

"Cylindrical centering device" means a positioning pin, which produces a sliding pivot connection with two degrees of freedom (translation and rotation along one axis only).

The term "clear centering device" means a positioning pin, which produces a rectilinear linear connection, with four degrees of freedom, or a point connection, with 5 degrees of freedom.

Thus, an actuator of the present disclosure will be able to solve the above problems, regardless of the element (cover, housing or intermediate plate) that has the two cylindrical centering devices.

Preferably, the housing comprises a housing periphery having at least two first attachment bores and in that the cover comprises a cover periphery having at least two second attachment bores so that the attachment of the cover and the housing is carried out by screwing with the aid of the first and second bores, the housing and cover peripheries not being contiguous when the cover and the housing are resting on the intermediate plate before screwing and being supported and at least partially contiguous after screwing, so as to constrain and block the movement of the intermediate plate. The problem of hyperstatism described above is thus turned to the advantage of the actuator and of the maintenance of the intermediate plate.

In a variant embodiment, the cover forms a valve body.

Preferably, the different guide surfaces of the shafts and axes of the reduction gear train are produced by the housing, the intermediate plate and the cover, the guide surfaces being ball bearings or plain bearings.

In a variant embodiment, the two centering pins and the intermediate plate form one and the same part, in order to facilitate the overall production and assembly.

In another variant embodiment, the housing is produced by overmolding a plastic material and has, on one of the holes of the pair of centering holes, two coaxial centering devices, one of which is cylindrical and the other of which is clear. This configuration makes it possible to envision a single housing, whatever the embodiment chosen for mounting and assembling the actuator, by varying the length of the centering pin engaging this centering hole.

In another variant embodiment, the housing is produced by overmolding a plastic material and it comprises a connector integrated into the overmolding.

In order to withstand higher operating temperatures, in a particular embodiment, the printed circuit has a first face accommodating electronic components and a second face free of components, the first face facing the electric motor and at the bottom of the housing, the second face facing the intermediate plate.

Then, advantageously and optionally, the first and second faces of the printed circuit are covered at least partially with a thermal paste, which is also in contact at least partially with, respectively, the housing and the intermediate plate.

In order to improve the performance of the actuator, in another variant embodiment, the wound stator has stator teeth, which are extended tangentially by magnetic field collectors; at least part of the teeth carry coils and are attached to the stator, and the coils have a frustoconical shape.

In this embodiment, in another variant embodiment, each stator tooth carrying a coil has a W shape with two adjacent teeth, the outer flanks of the frustoconical coil being parallel to the inner flanks of the adjacent teeth.

To optimize the performance of this embodiment, if D denotes the number of stator teeth and GAP denotes the tangential distance between the field collectors between two adjacent teeth, the relationship will be favored:

$$GAP \text{ is equal to } 360/(8{\times}D){\pm}5\%.$$

Still in this same embodiment, to optimize performance, if E denotes the radial thickness of the rotor magnet, if EP1 denotes the minimum radial thickness at the end of the field collector and EP2 denotes the maximum radial thickness at the origin of the field collector, the relationship will be favored:

$$EP2{\geq}0.75{\times}E \text{ and } EP1{<}EP2.$$

Finally, in a desire to simplify the electrical machine of the actuator and to improve performance, the rotor comprises a permanent magnet that is partially overmolded by an injected plastic material, this overmolding partially encompassing the rotor shaft and forming a plane orthogonal to the shaft on which a sensor magnet is positioned. In an alternative embodiment, the overmolded magnet directly forms a sensor magnet without adding an additional magnet.

BRIEF DESCRIPTION OF THE DRAWINGS

Other features and advantages of the present disclosure will emerge on the following reading of detailed embodiments, with reference to the accompanying drawings, which respectively show.

DETAILED DESCRIPTION

Detailed Description of a First Actuator

Figure 1:
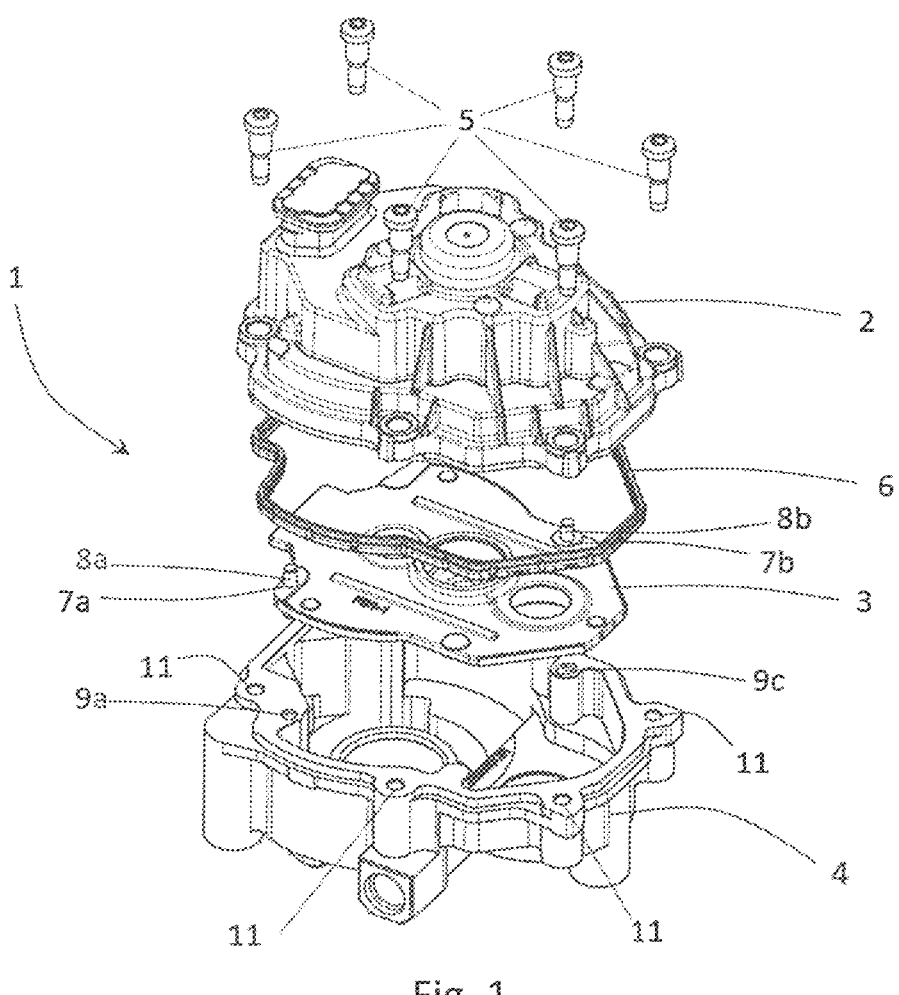
FIG. 1, an exploded perspective view of a first actuator according to a first embodiment, FIG. 2, an exploded perspective view of the first actuator according to a second embodiment, FIG. 3, an exploded perspective view of the first actuator according to a third embodiment, FIG. 4, an exploded perspective view of a second actuator according to a first embodiment, FIG. 5, an exploded perspective view of the second actuator according to a second embodiment, FIG. 6, an exploded perspective view of the second actuator according to a third embodiment, FIG. 7, a first detail and sectional view of the second actuator according to the second embodiment, FIG. 8, a second detail and sectional view of the second actuator according to the second embodiment, FIG. 9, a perspective and sectional view of the second actuator according to the second embodiment, FIG. 10, an overall perspective view of the second actuator, FIG. 11, a perspective view in partial section of the actuator of FIG. 10, FIG. 12, an isolated overview of a housing and of an intermediate plate of the second actuator, FIG. 13, a perspective view in partial section of the assembly of FIG. 12, FIG. 14, a view in partial section of the second actuator in a variant embodiment, FIG. 15, an overall perspective view of the first actuator in a variant embodiment, FIG. 16, a perspective view in partial section of the actuator of FIG. 15, FIG. 17, an isolated overall view of a housing and of an intermediate plate of the first actuator in a variant embodiment, FIG. 18, a perspective view in partial section of the assembly of FIG. 17, FIGS. 19*a* and 19*b*, two views in partial section from two different viewing angles of the first actuator in a variant embodiment, FIG. 20, an isolated view in section of an electric motor of the second actuator, FIG. 21, an isolated view of an electric motor stator integrated into the first or second actuator in a variant embodiment, FIG. 22, an isolated and partially exploded view of the stator of FIG. 21, FIG. 23, an isolated view in cross-section of the stator of FIG. 21, FIG. 24, an isolated view in longitudinal section of an electric motor rotor in a variant embodiment, FIG. 25, a view in partial section of an actuator according to an alternative embodiment of the mechanical reduction gear, FIG. 26, an isolated view of an alternative embodiment of an electric motor rotor, which can be used in an actuator according to the present disclosure, FIGS. 27 and 28, two partial sectional views showing alternative embodiments of the stators of an electric motor that can be used in an actuator according to the present disclosure, FIG. 29, an exploded perspective view of an actuator according to an alternative embodiment, and FIG. 30, a view in partial section of the actuator of FIG. 29.

FIG. 1 shows a first embodiment of an actuator (1) according to the present disclosure. In general and common to all the embodiments covered by the present disclosure, the actuator (1) is formed by three main parts: a housing (2), an intermediate plate (3) and a cover (4). Also seen in FIG. 1, as well as certain other figures, are fixing screws (5) and a sealing gasket (6) whose positioning will be explained below. This sealing gasket (6) is the only seal ensuring the tightness between the housing and the cover, whereas in the solutions of the prior art and, in particular, patent WO2018/088356, it is necessary to provide two seals.

FIG. 1 shows a first example of an actuator in which the housing (2) is made of an injectable plastic material. This housing (2) has the particular function of accommodating an electric motor (not visible here), which will be detailed below, by overmolding the stator of this motor with the plastic material. The purpose of the cover (4), in particular, is to accommodate a mechanical reduction gear (not visible here), which will be detailed below. The purpose of the intermediate plate (3) is to guide the rotating elements of the mechanical reduction gear while allowing the mechanical connection between the rotor of the electric motor and the mechanical reduction gear. The sealing gasket (6) is intended to be positioned at the interface between the housing (2) and the cover (4) so as to achieve tightness by axial crushing during assembly. The fixing screws (5) are intended to fix the housing (2) on the cover (4) at the tappings (11) by constraining the intermediate plate as will be explained later. The tappings (11) can also be blind holes in which self-forming screws are screwed.

The support of the intermediate plate is located, solely, around the centering holes receiving the pins (8*a*, 8*b*), which makes it possible, in particular, to place a single sealing gasket at the interface between the cover and the housing and to improve the tightness compared to the solution proposed in the document of the prior art WO2018/088356.

In a first embodiment of the present disclosure linked to this first actuator (1), the plastic housing (2) has, not visible here, a first pair of holes formed by a cylindrical centering device and a clear centering device; the intermediate plate (3) has a second pair of holes in the form of two bores, or cylindrical centering devices (7*a*, 7*b*), which receive two centering pins (8*a*, 8*b*).

These two centering pins (8*a*, 8*b*) can be:

Either dissociated from the intermediate plate and introduced downstream of the manufacture of the plate Or integrated into the intermediate plate and therefore form a single part with the plate, then forming a single part.

The cover (4) has a third pair of holes formed by a cylindrical centering device (9*a*) and a clear centering device (9*c*) here in the form of an oblong bore. The clever use of only two pins and three pairs of holes on the three main elements mentioned above, two of the pairs of holes of which form cylindrical centering devices and clear centering devices and the other pair of holes of which forms two cylindrical centering devices, the corresponding cylindrical and clear centering devices, makes it possible to guarantee an optimal relative positioning of the three elements. The positioning of the pins (8*a*, 8*b*) on the intermediate plate (3) in cylindrical centering devices (7*a*, 7*b*) represents the preferred configuration because it makes it possible to consider a single type of intermediate plate (3) that is compatible with several forms of housing (2) and/or cover (4).

Figure 2:
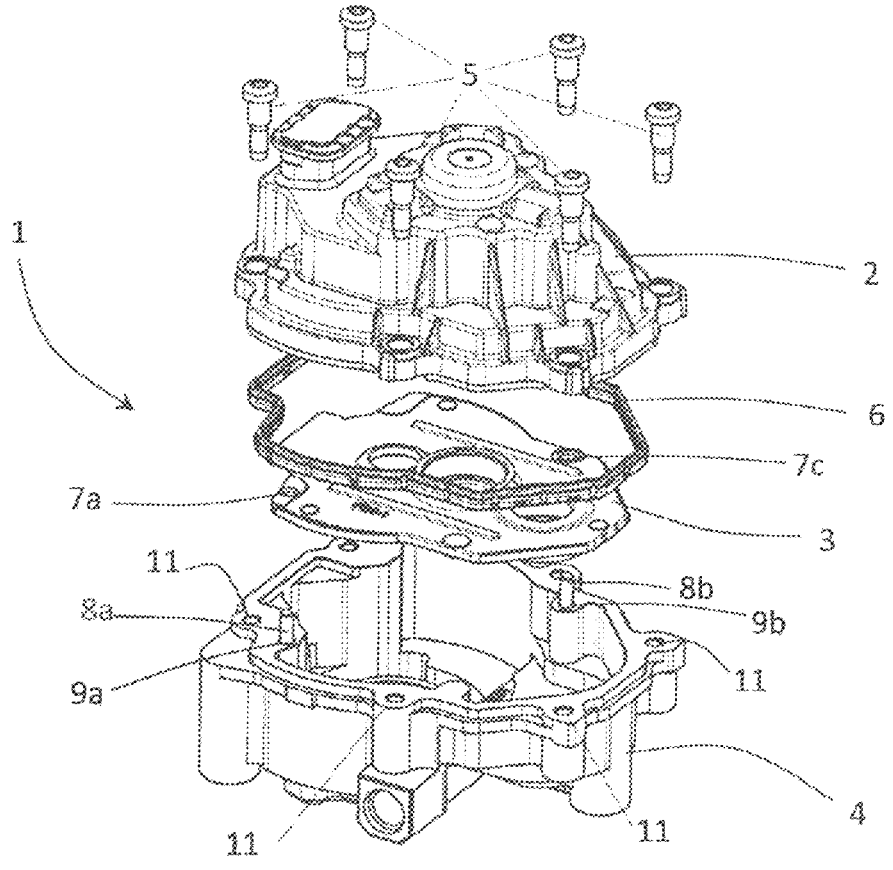

FIG. 2 is a second embodiment of this first actuator, which differs from the first embodiment in that the centering pins (8*a*, 8*b*) are positioned in the pair of holes in the cover (4), forming two cylindrical centering devices (9*a*, 9*b*), and in that the intermediate plate (3) comprises a pair of holes forming a cylindrical centering device (7*a*) and a clear centering device (7*c*). As with the first embodiment, the plastic housing (2) has, not visible here, a pair of holes formed by a cylindrical centering device and a clear centering device. This is an alternative embodiment to the first embodiment.

Figure 3:
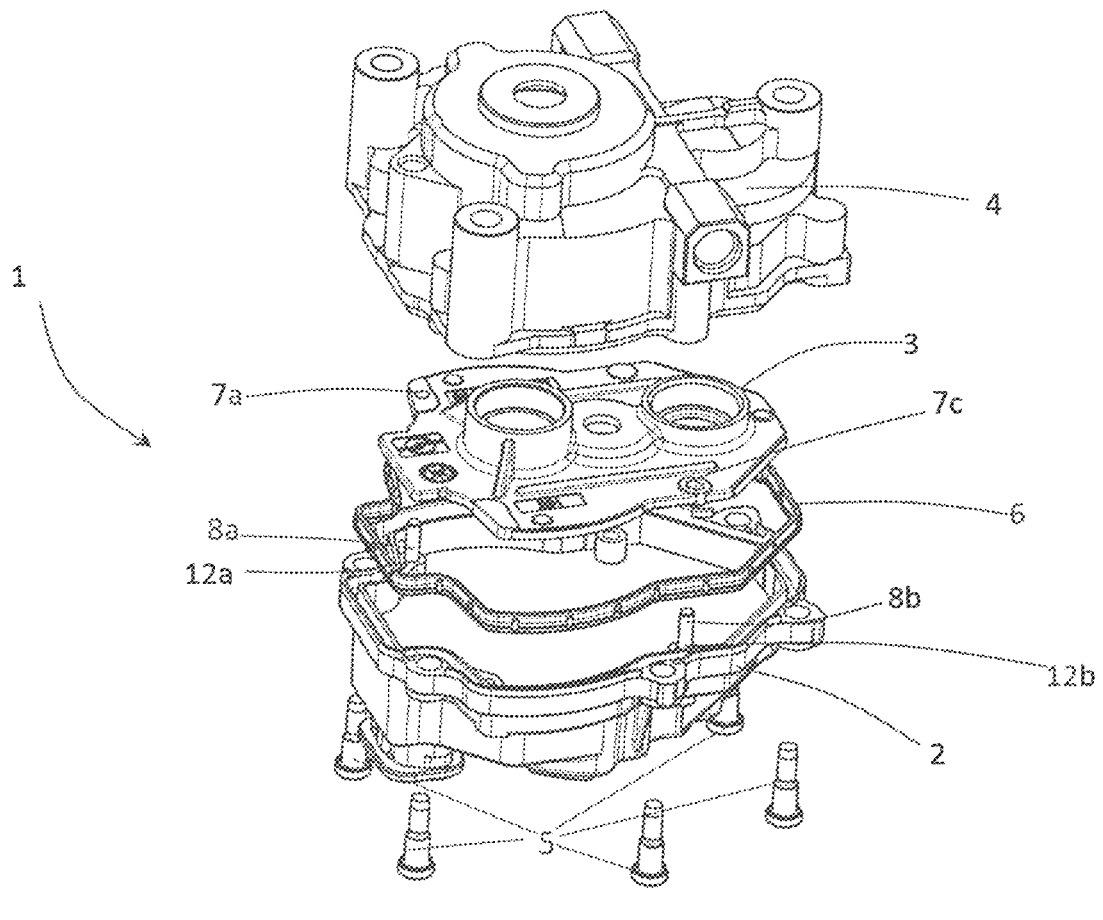

A third alternative embodiment of this first actuator is shown in FIG. 3. It differs from the first and second embodiments in that the centering pins (8*a*, 8*b*) are positioned in the pair of holes of the plastic housing (2), forming two cylindrical centering devices (12*a*, 12*b*), and in that the intermediate plate (3) comprises a pair of holes forming a cylindrical centering device (7*a*) and a clear centering device (7*c*). As with the first embodiment, the cover (4) has, not visible here, a pair of holes formed by a cylindrical centering device and a clear centering device.

Detailed Description of a Second Actuator

Figure 4:
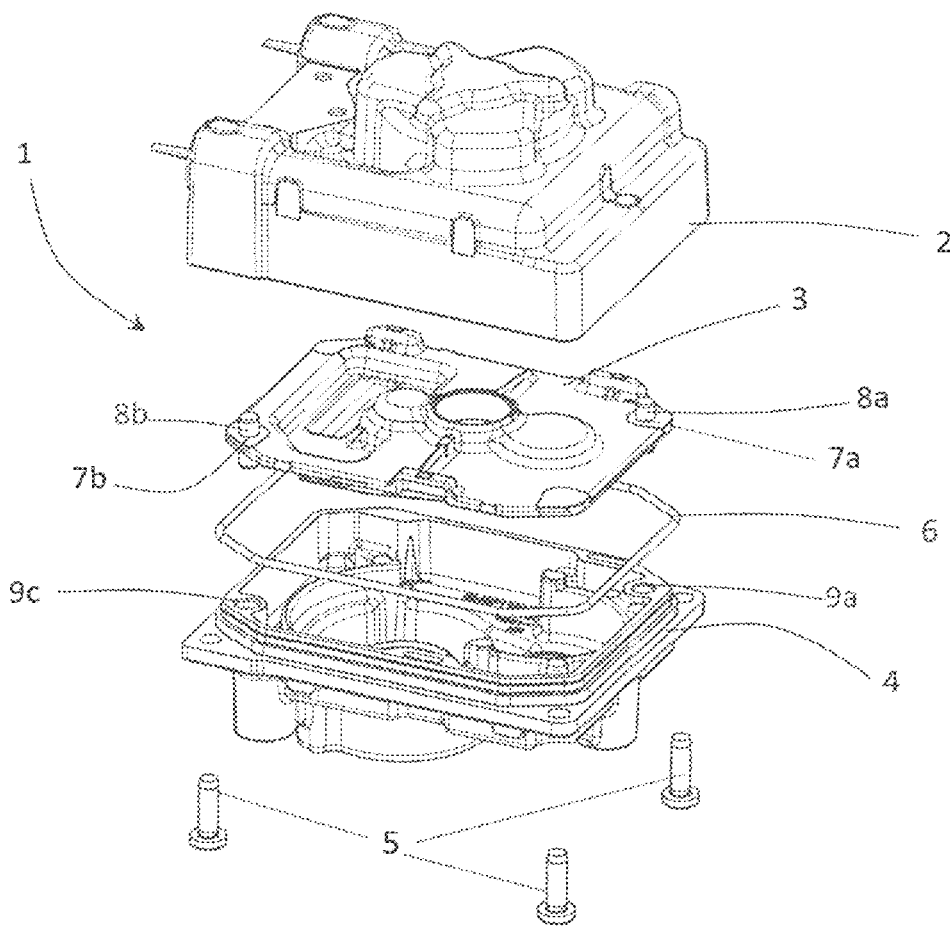
Figure 5:
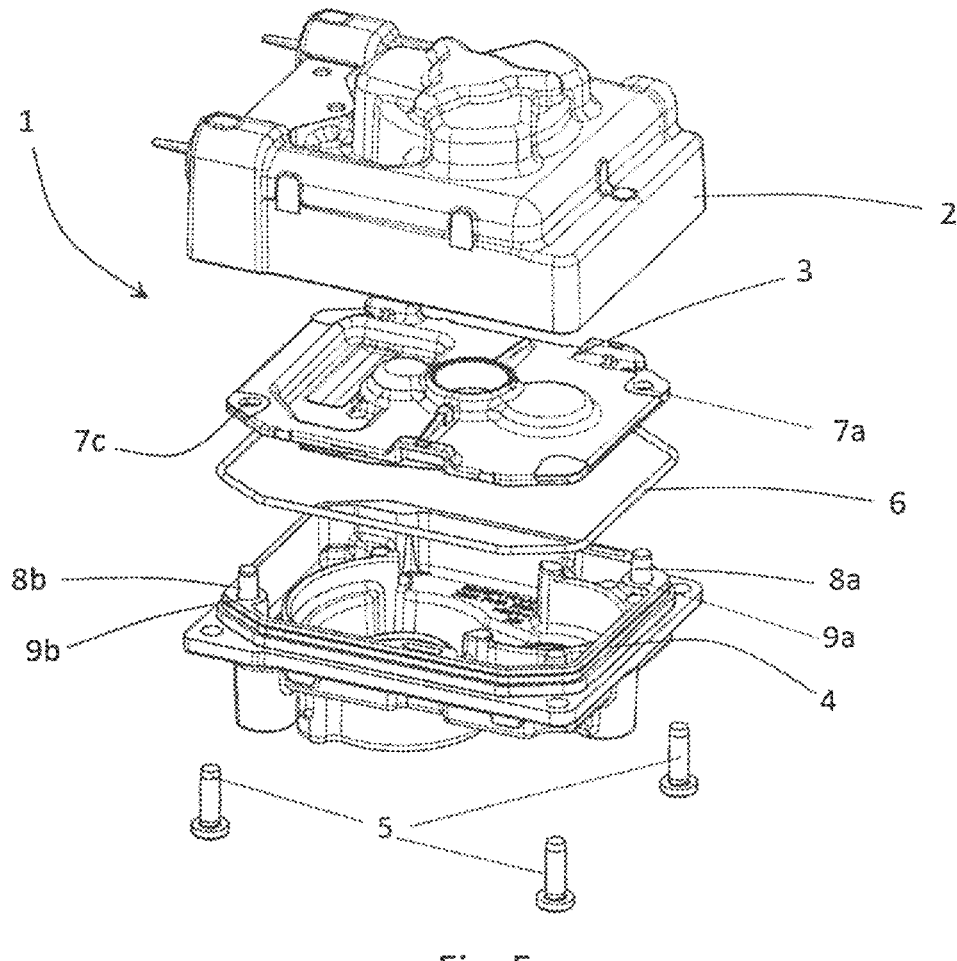
Figures 6, 7:
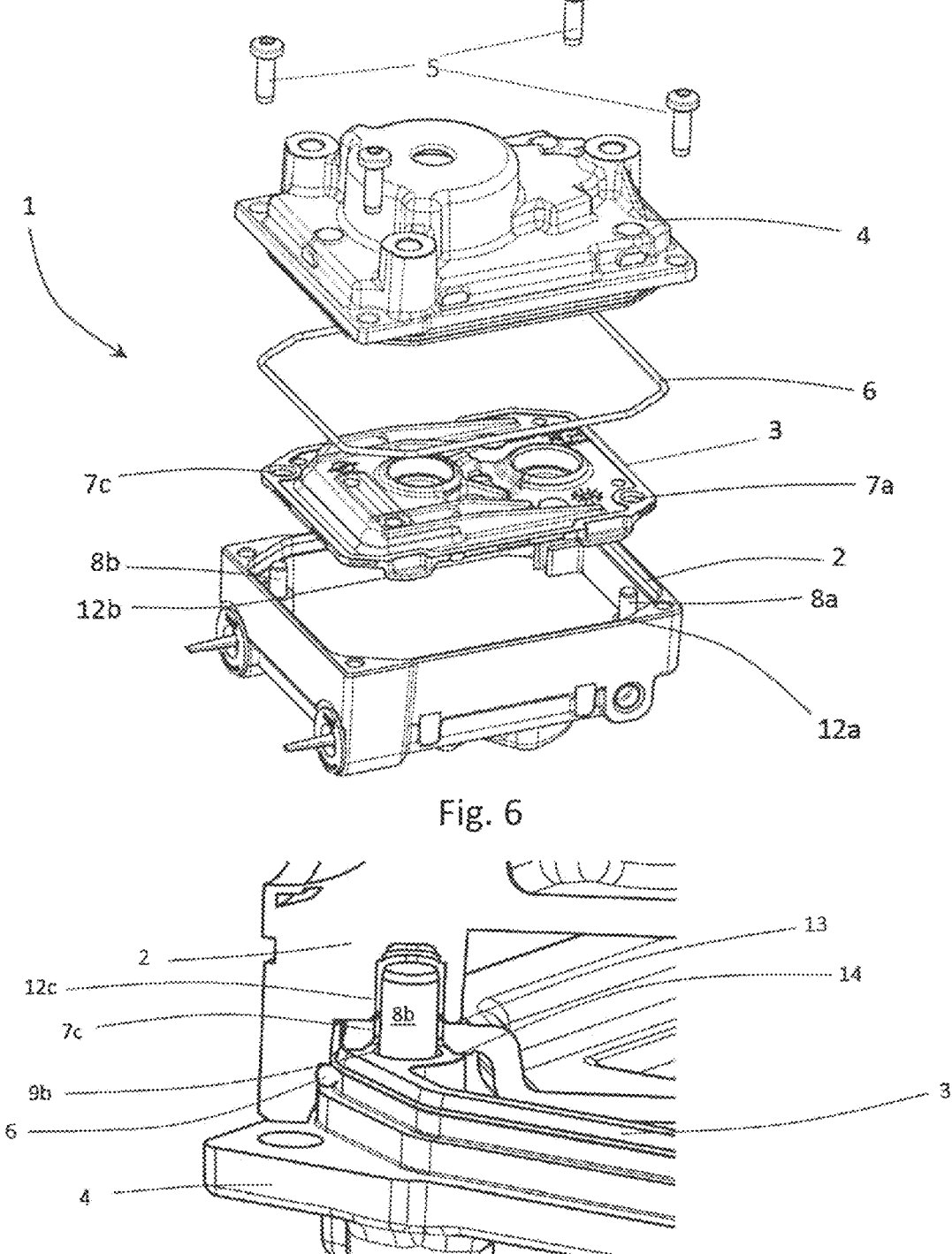

FIGS. 4, 5 and 6 show, for a second type of actuator, the equivalents to FIGS. 1, 2 and 3 with regard to the relative positioning of the various pairs of holes and cylindrical and clear centering devices. The second actuator differs from the first in that the housing (2) here is formed by a metallic material, for example, of cast or injected aluminum, in which the stator of an electric motor is intended to be fixed, for example, by screwing. This embodiment makes it possible to produce a more robust actuator making it possible, in particular, to better dissipate the thermal energy given off by the printed circuit (not shown in these figures) carrying the power supply and control components of the motor and by the electric motor. The second actuator also differs from the first in that the fixing screws (5) are intended to be screwed into the housing (2) instead of the cover (4). Finally, it differs from the first in that the sealing gasket (6) produces tightness by radial compression of the sealing gasket (6). Similar to the explanations in FIGS. 1, 2 and 3:

In a first embodiment of the present disclosure linked to this second actuator in FIG. 4, the metallic housing (2) has, not visible here, a first pair of holes formed by a cylindrical centering device and a clear centering device; the intermediate plate (3) has a second pair of holes in the form of two cylindrical centering devices (7a, 7b), which receive two centering pins (8a, 8b) and the cover (4) has a third pair of holes formed from a cylindrical centering device (9a) and a clear centering device (9c) here in the form of an oblong bore.

FIG. 5 is a second embodiment of this second actuator, which differs from the first embodiment in that the centering pins (8a, 8b) are positioned in the pair of holes in the cover (4), forming two cylindrical centering devices (9a, 9b), and in that the intermediate plate (3) comprises a pair of holes forming a cylindrical centering device (7a) and a clear centering device (7c). As with the first embodiment, the metallic housing (2) has, not visible here, a pair of holes formed by a cylindrical centering device and a clear centering device. This is an alternative embodiment to the first embodiment.

A third alternative embodiment of this second actuator is shown in FIG. 6. It differs from the first and second embodiments in that the centering pins (8a, 8b) are positioned in the pair of holes of the metallic housing (2), forming two cylindrical centering devices (12a, 12b), and in that the intermediate plate (3) comprises a pair of holes forming a cylindrical centering device (7a) and a clear centering device (7c). As with the first embodiment, the cover (4) has, not visible here, a pair of holes formed by a cylindrical centering device and a clear centering device.

Detailed Description of Main Functions

Figure 8:
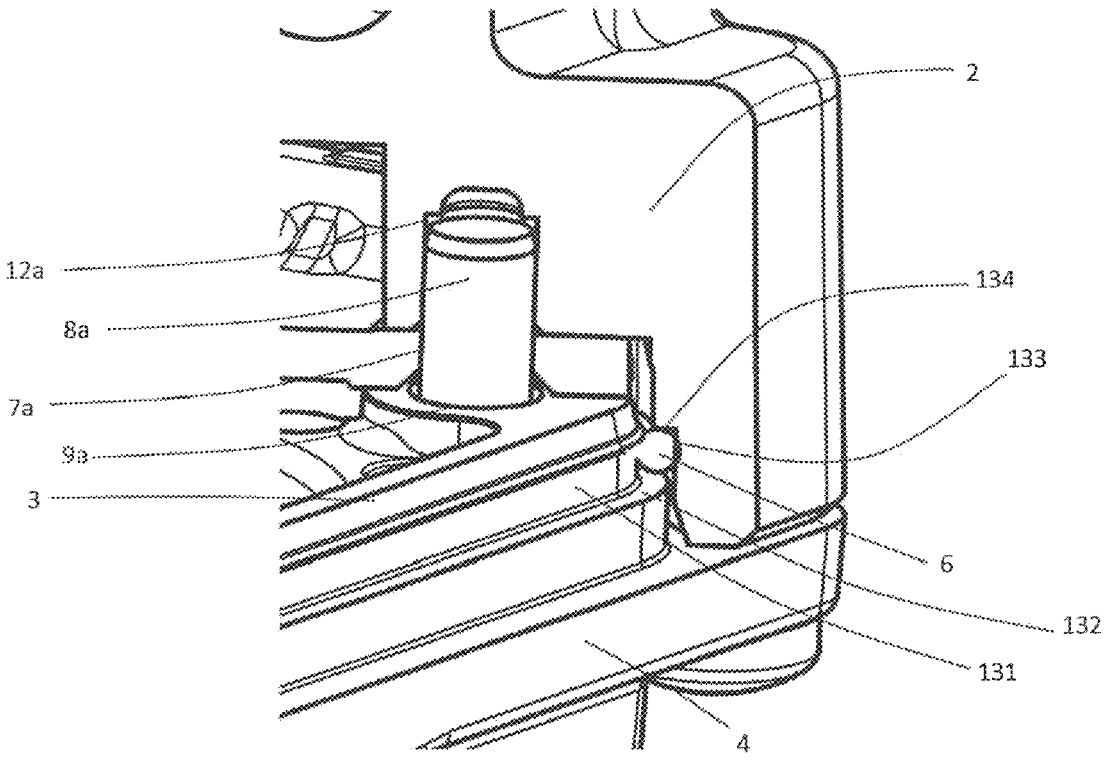
Figure 9:
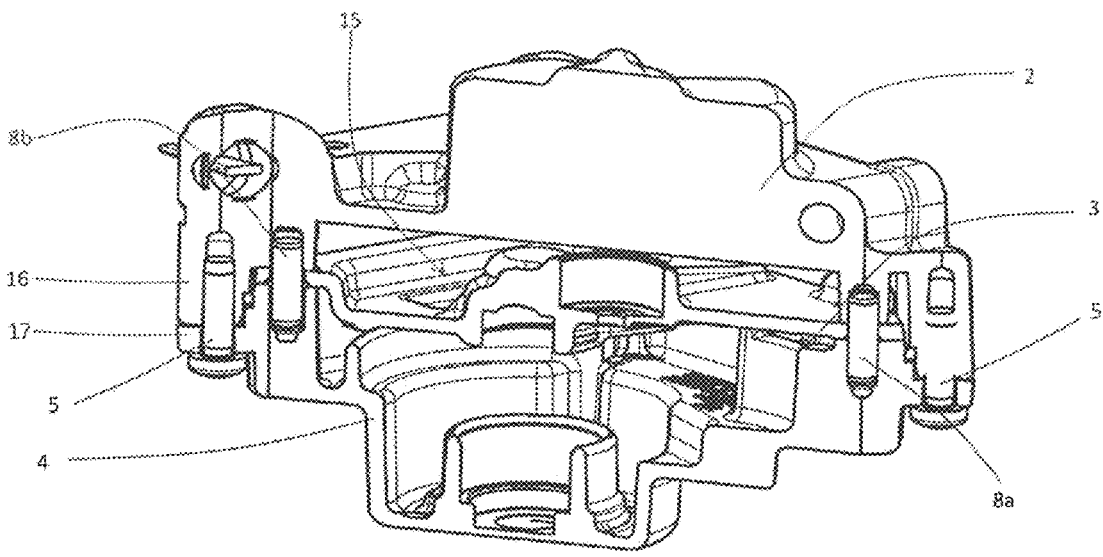

FIGS. 7, 8 and 9 are detail or sectional views of the second embodiment of the second actuator. Nevertheless, the descriptions and characteristics of the elements and of the functions relating thereto below can fully apply, mutatis mutandis, to the other embodiments described above.

FIGS. 7 and 8 are isolated views at the centering devices, respectively, clear (7c, 12c) and cylindrical (7a, 12a), produced on the intermediate plate (3) and the housing (2), allowing mounting, guiding and blocking of the rotation of the latter on the centering pins (8a, 8b) placed, respectively, in the cylindrical centering devices (9a, 9b) of the cover (4). The intermediate plate (3) is held axially between the housing (2) and the cover (4) by the stress exerted by the latter at two axial support surfaces (13,14) around centering holes between, respectively, on the one hand the housing (2) and the intermediate plate (3) and on the other hand the intermediate plate (3) and the cover (4). Referring to FIG. 9, the intermediate plate (3) is installed in a first cavity (15) of the housing (2). Thus, when screwing the cover (4) on the housing (2), or the housing (2) on the cover (4) for an embodiment of the first actuator, the periphery (16) of the housing (2) comes close to the periphery (17) of the cover (4), first without contact, then, by elasticity of the components involved, with contact over the course of the screwing, and the hyperstatic mechanical situation generated at the strained connection between the housing (2), the intermediate plate (3) and the cover (4) ensures perfect holding in place of the intermediate plate (3) via the elasticity of the periphery (17). The screw-mounted actuator (1) is thus visible in FIG. 9.

Referring to FIG. 8, the tightness of the actuator is ensured by the sealing gasket (6) positioned around a first radial surface (131) of the cover (4) and inside a second radial surface (133) of the housing (2) and between a first axial surface (132) of the cover (4) and a second axial surface (134) of the housing (2), the terms "axial" and "radial" being interpreted in relation to the motor output shaft. In this embodiment of the actuator, the tightness is produced radially by crushing the sealing gasket (6) between these first and second surfaces (131, 133).

Figure 10:
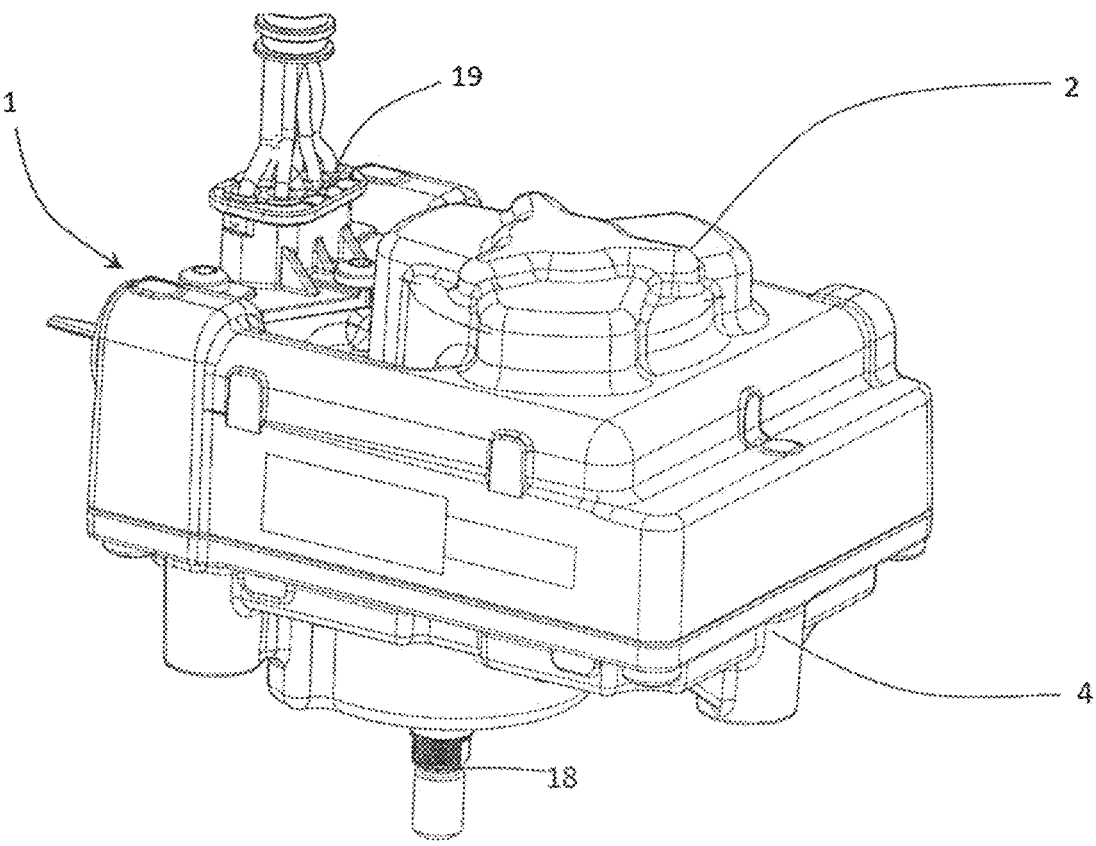
Figure 11:
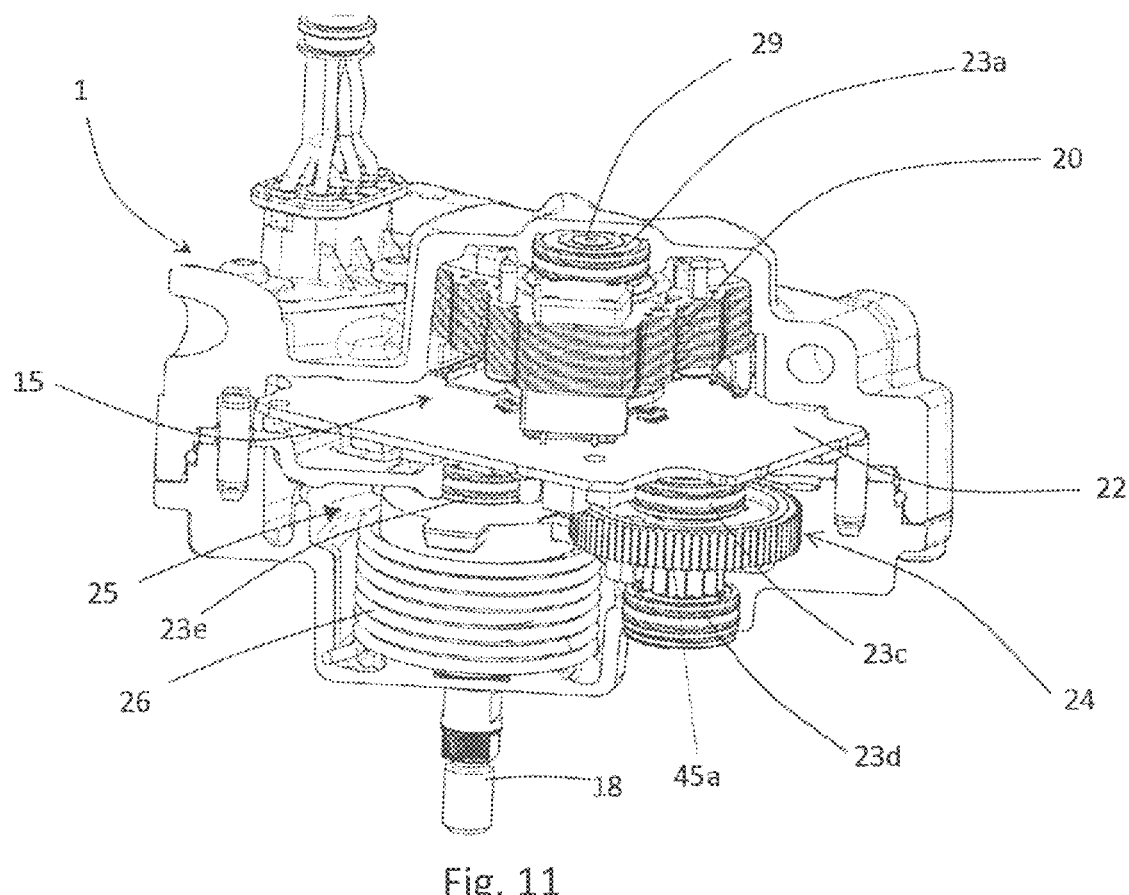

FIGS. 10 and 11 show overall views, respectively, full and in partial section, of the second actuator in a first so-called "complete" variant where this actuator can be positioned at an external member (not shown) owing to its output shaft (18). The actuator (1) is supplied with electrical voltage and with a positioning signal via a connector (19). The housing (2) receives, in its cavity (15), an electric motor formed by a stator (20) and a rotor (not visible) as well as a printed circuit (22) in electrical connection with the stator winding (20) by a press-fit type connector and in a mechanical connection screwed into the cavity (15) of the housing (2). The housing (2) receives a ball bearing (23a) serving to guide the rotor shaft (not visible here). A mechanical reduction gear (24), positioned in the cover (4), is driven by the rotor and is formed of toothed wheels mounted on axes (not visible). The cover (4) defines a second cavity (25) in which the axes of the mechanical reduction gear carrying a toothed wheel (45a) by means of bearings (23c and 23d) are mounted and guided on a first end. The intermediate plate (3) serves to guide one end of the rotor shaft (29), not visible here but shown in FIG. 12, owing to the bearing (23b), not visible here but shown in FIG. 12, and is used to guide the other ends of the axes of the mechanical reduction gear (24) by means of bearings (23c, 23e). In this embodiment, without this being limiting, a torsion spring (26) is also installed in the cover (4) applying a torque to the output shaft (18) making it possible to return the movable assembly to a predefined position when the power supply of the electric motor is switched off or fails. It should also be noted that the various bearings (23a, 23b, 23c, 23d, 23e, 23g, 23h) designated in all of the figures can be replaced by plain bearings or any other guide element without this departing from the present disclosure.

Detailed Description of the Alternative Embodiments

Figure 12:
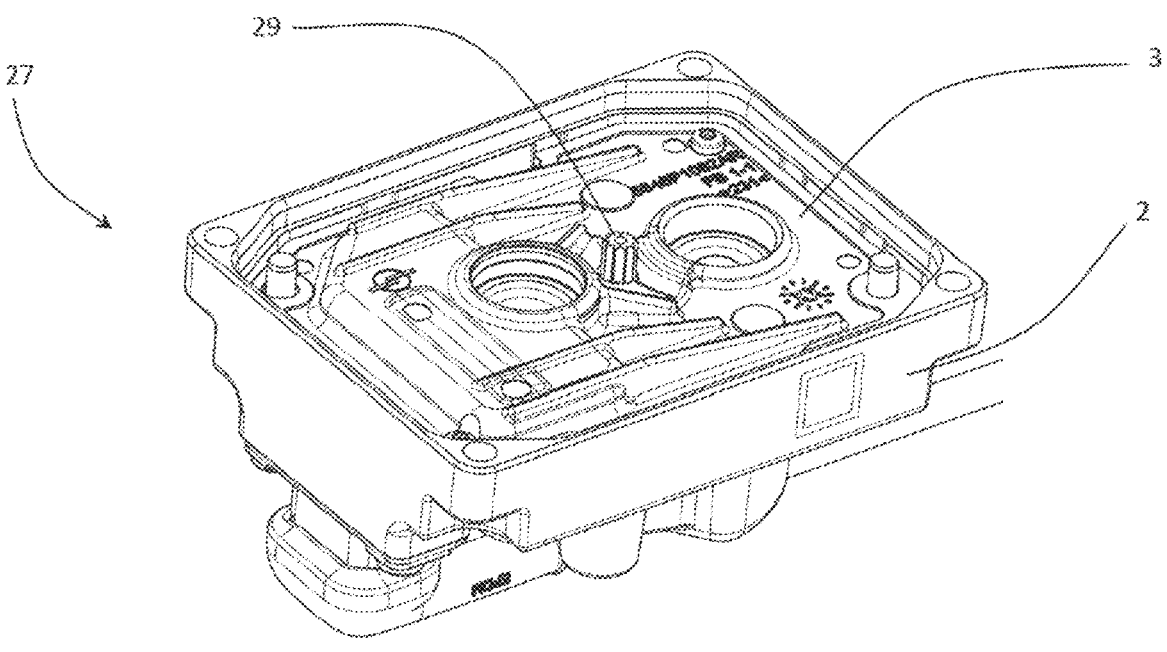
Figure 13:
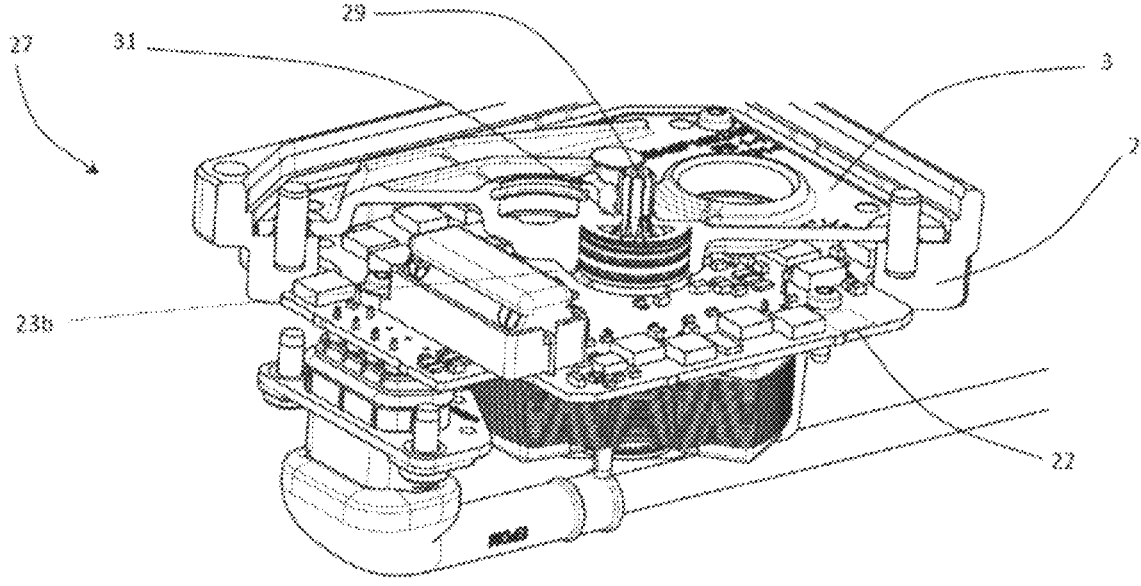
Figure 14:
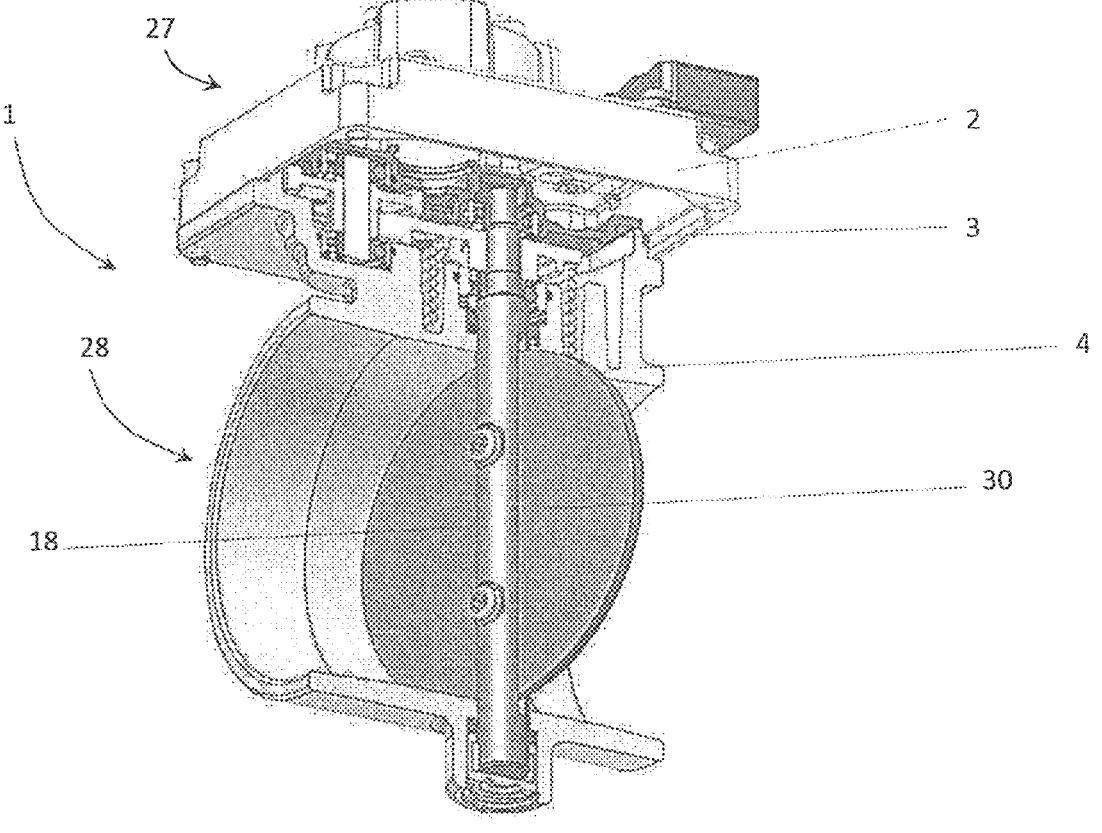

FIGS. 12 and 13 show the second actuator in a second variant called "half-actuator" where a first assembly (27) of the actuator is shaped by assembling the housing (2) and the intermediate plate (3) according to the third embodiment described above. The complete actuator is then produced by assembling this first assembly (27) on the cover (4) as shown in FIG. 14. In this particular embodiment, the cover (4) directly integrates the component to be controlled. By way of example given in FIG. 14, the cover (4) forms a valve body (28) and the output shaft (18) carries a shutter (30) of the "butterfly" type, the whole forming an air intake valve for an internal combustion engine. When mounting the actuator (1), the first assembly (27) is therefore mounted directly on the valve body (28) forming the cover (4) and the mechanical reduction gear (24) engages the rotor shaft (29) of the rotor (21) through a slot (31) of the intermediate plate (3).

FIG. 13 shows a partial sectional view of the first assembly (27), which makes it possible to visualize the printed circuit (22), which comprises all the electronic components used to power and control the motor of the actuator (1), as well as the ball bearing (23b) serving to guide the rotor shaft (29) of the rotor (21), the outer ring of which is fitted in a housing of the intermediate plate (3).

Figure 15:
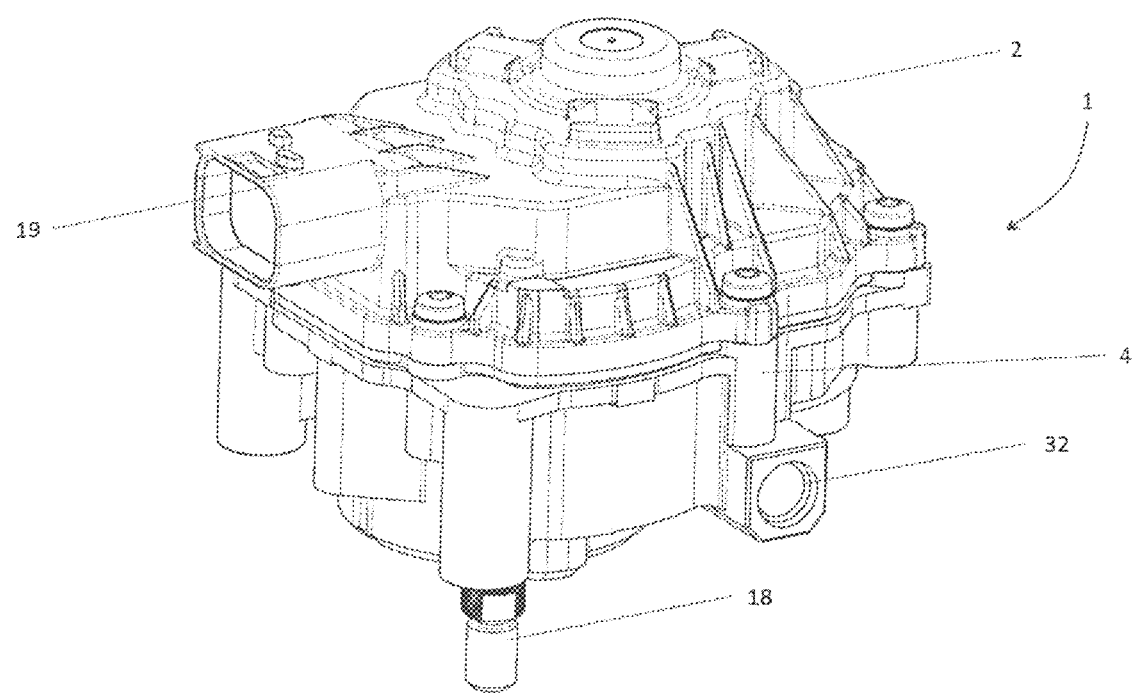
Figure 16:
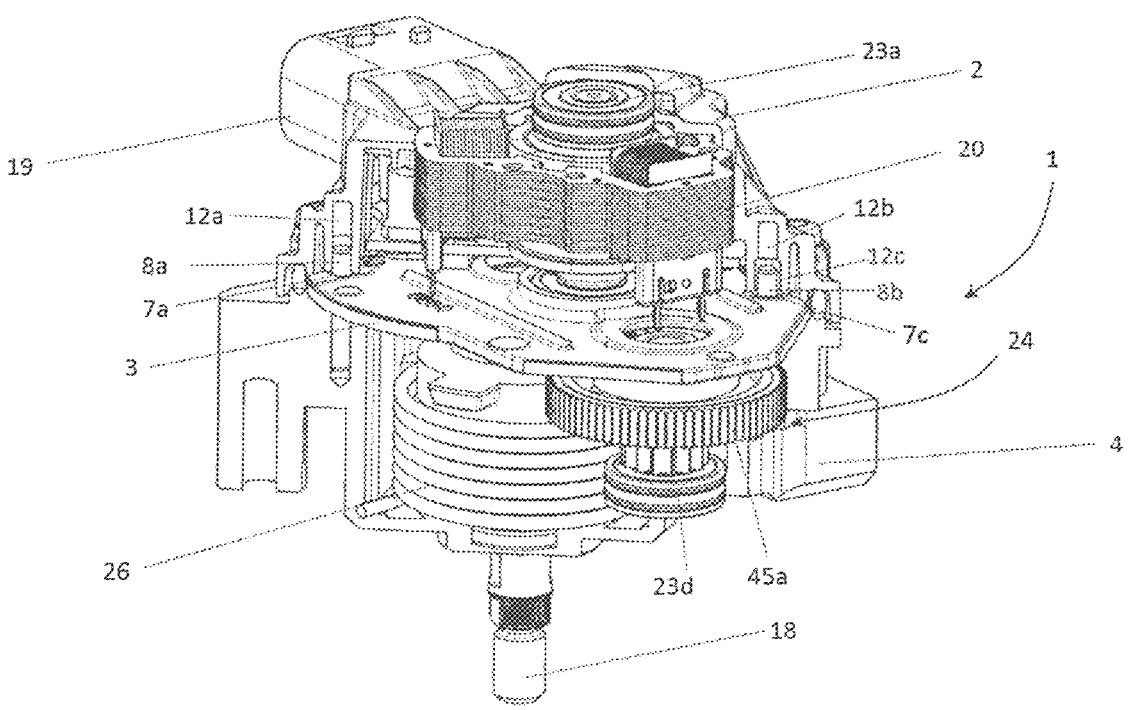

FIGS. 15 and 16 show the first actuator in a "complete" variant where the connector (19) is plastic-molded with the body of the housing (2). Its orientation is radial, but it can also be considered axial above the housing (2). The opening (32) visible in the cover (4) is an inlet for a heat transfer fluid serving to cool the actuator (1) when the latter is used at high load and in a high-temperature environment, for example, near a spark-ignition engine.

FIG. 16 is a partial sectional view making it possible to assess the relative positioning of the bearings (23a, 23d) and of the stator (20) in the housing (2), separated by the intermediate plate (3) of the mechanical reduction gear (24) and the torsion spring (26). At the housing (2), this variant also has two coaxial centering devices, one being cylindrical (12b), the other being free (12c). This combined embodiment makes it possible to envisage the use of a single type of overmolding compatible with all three different embodiments described in FIGS. 1, 2 and 3, in conjunction with the height of the centering pin (8b) used. Here in FIG. 16, the elements of the complete actuator are mounted according to the first embodiment; the centering pin (8b) is a short pin that engages in the clear centering device (12c) of the housing (2).

Figure 17:
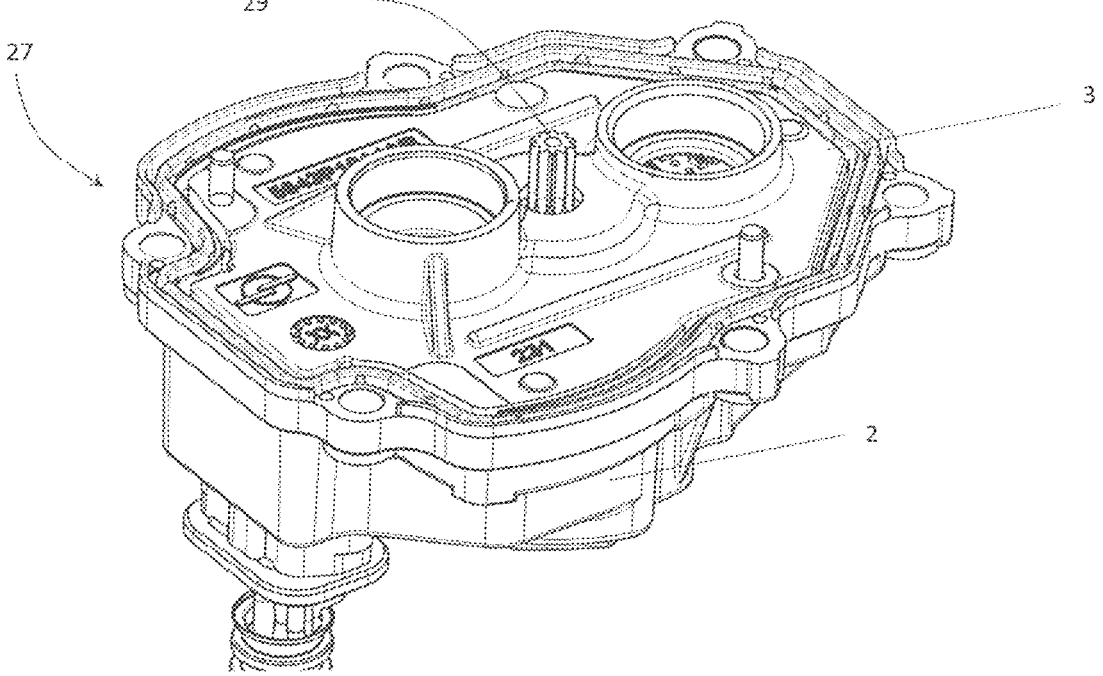

FIGS. 17 and 18 show a "half-actuator" variant of the first actuator formed by a first assembly (27) comprising the housing (2) and the intermediate plate (3). In this variant, the centering pin (8b) is a long pin that engages in the cylindrical centering device (12b) of the housing (2), the assembly being according to the third embodiment described above.

FIGS. 19a and 19b show a variant embodiment of the actuators, here on the basis of the first actuator although this is not limiting, at the printed circuit (22) and promoting the heat dissipation emitted by the printed circuit (22). In this variant, the printed circuit (22) carries all the components on only one of its faces, this first face (33) being that oriented axially toward the electric motor and the bottom of the housing (2). This embodiment makes it possible on the one hand to attach the second face (34) of the printed circuit, axially opposite the first face (33), to the intermediate plate (3), which will promote, by conduction, the intermediate plate being chosen in a thermally conductive material, the evacuation of heat through the metal part of the cover (4). On the other hand, it is possible to use a thermal paste, in a cloud of points on the printed circuit (22), on both sides of the printed circuit (22), this paste being crushed between the housing (2) and the intermediate plate (3) on the one hand and the cover (4) and the intermediate plate (3) on the other hand, in order to further promote this thermal conduction toward the most conductive parts of the actuator (1). FIGS. 19a and 19b show the toothed output wheel (45c) of the reduction gear, as well as a torsion spring (26) that acts on this toothed output wheel to return the output shaft (18) to a determined position when the motor is stopped.

FIG. 20, showing a detail view of the electric motor in section, shows the use of a magnet (35) at the rotor (21), the length of which can be variable in order to increase the performance of the motor. In fact, at a given axial height of the stator (20), the axial height of the magnet (35) at the rotor (21) influences the torque produced at constant electric power. This embodiment is only a variant compared to a more conventional case where the height of the magnet (35) is equivalent to that of the stator (20).

Figure 23:
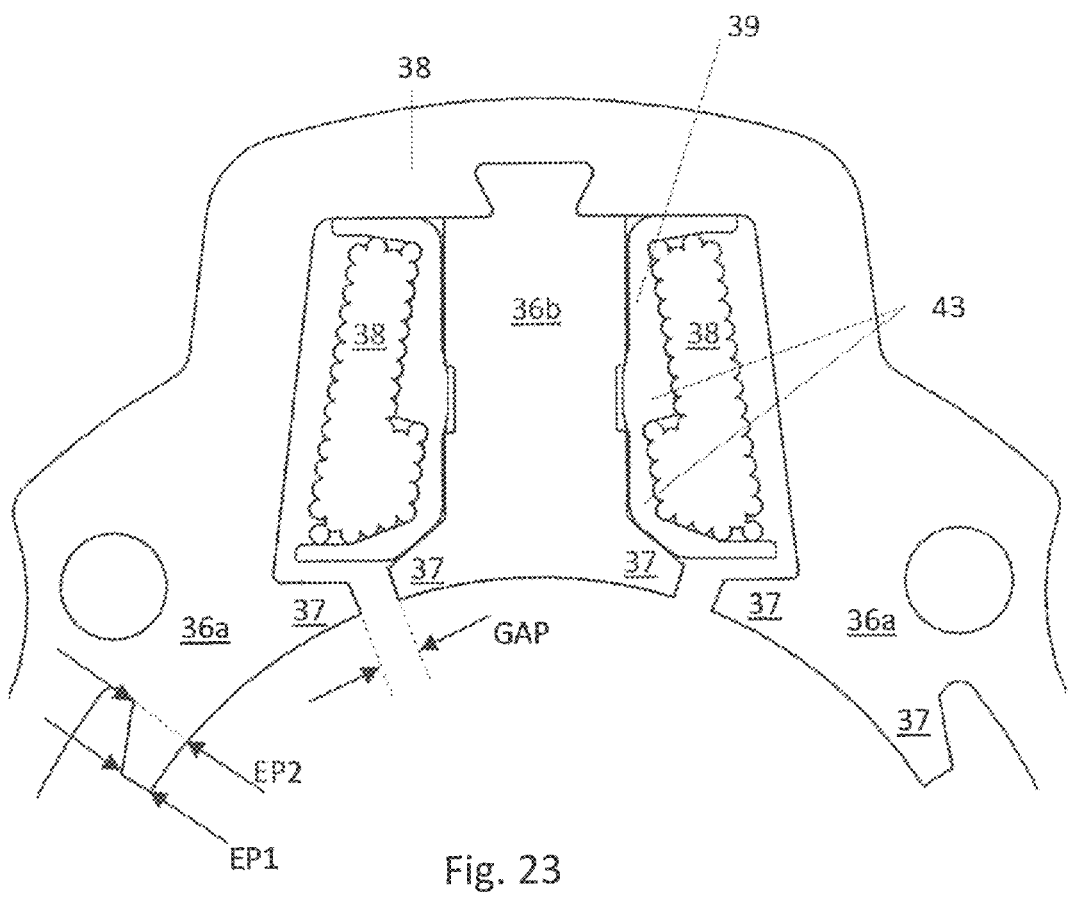

FIGS. 21, 22 and 23 show an example of an electric motor stator (20) that can be used by the first or second actuator or any other actuator not shown here but covered by the present disclosure. In particular, this stator (20) proposes to solve the problems of limiting the performance of actuators, in particular, the limitations induced by the torque oscillation during electrical switching and by the magnetostatic torque. This stator (20) is also associated with a solution for optimizing the copper filling of the coil.

For this stator (20), all of the stator teeth (36a, 36b) have field collectors (37) extending, relative to the axis of rotation of the rotor, in a tangential direction. To this end, the stator teeth (36a) not receiving a coil are in one piece with the rest of the stator iron circuit produced in the form of a bundle of sheets while the teeth (36b) receiving a coil (38) are independent and attached on the iron circuit. In order to optimize the performance of the actuator, in particular, the torque oscillation and the magnetostatic torque, the field collectors have the following geometric characteristics in an axial plane: relative to a quantity D representing the number of teeth on the stator, it is recommended to respect the formula:

$$GAP \approx 360/(8 \times D), \text{ } GAP \text{ representing the tangential}$$
distance separating the collectors of two adjacent teeth;

Relative to the quantity E, radial thickness of the rotor magnet visible in FIG. 20, it is recommended:

$EP2 \geq 0.75 \times E$ and $EP1 < EP2$, EP1 representing the minimum radial thickness at the end of the field collector (37), EP2 representing the maximum radial thickness at the origin of the field collector (37).

The teeth (36b) have a central section allowing the placement of the coil (38) by translation from the outside/rear. Likewise, the connection means (mechanical and magnetic) between the attached tooth (36b) and the stator circuit is inscribed in the minimum section of the coil (38). It is also possible to envisage a winding solution directly on the tooth while retaining the possibility of removing the coil (38) and recovering the tooth (36b) in the event of a manufacturing defect. The teeth (36b) thus equipped with their coil (38) are attached and linked to the stator (20) in an axial direction relative to the axis of rotation of the rotor (21). The connecting means must ensure good mechanical retention of the tooth (36b) on the stator (20), and must also provide a good quality magnetic seal so as not to introduce parasitic magnetic permeance, which deteriorates performance. A dovetail-type solution is particularly suitable in this case, allowing an economical solution, simple shapes with precise tolerances and good mechanical support. The coil body (39) has three recesses (40), without this being limiting, on either side of the coils (38) for the press-fit supports on the tooth (36b) during the assembly operation. Since the stator circuit has a W-shaped periodicity over an angular sector of 120°, the coil (38) then has a shape complementary to this W in order to maximize the degree of copper filling of the section that is actually available. The shape of the coil thus obtained is substantially frustoconical. The proposed conical solution allows a gain in the torque without significantly altering the impedance of the coil by an optimized filling of the interdental notch.

To produce and industrialize this particular type of winding, the coil body (39) has a central peripheral sawtooth section, the angle of the teeth (43) being equivalent to the angle of the cone of the winding (approximately 7° over this non-limiting example), with two or more teeth (43), the teeth (43) not necessarily being of identical length. In order to ensure good cohesion of the stator (20) thus assembled, and to improve its thermal behavior, it will ideally, but non-limitingly, be overmolded with a thermoplastic material located at each attached tooth (36*b*)/coil (38) pair. Alternatively, each tooth (36*b*) can be molded independently before being attached and fixed to the stator.

Figure 24:
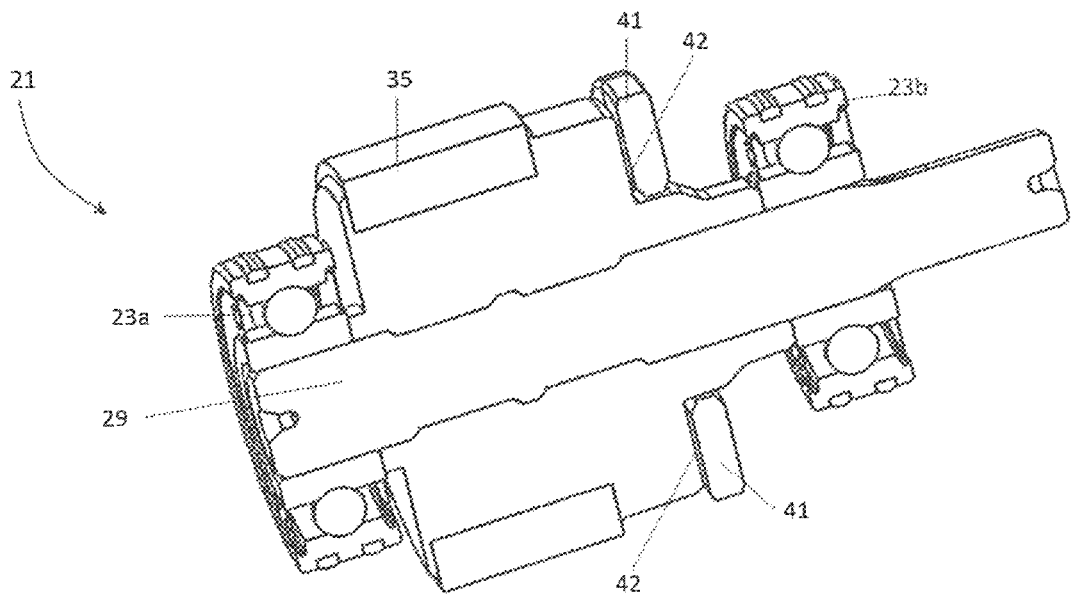

FIG. 24 shows an embodiment of the rotor (21) of an electric machine, which can advantageously be used in the present disclosure. This rotor (21) is composed of a permanent magnet (35) partially overmolded by an injected plastic material, of a rotor shaft (29) also overmolded by the same plastic material, and of a sensor magnet (41) positioned on a plane (42) orthogonal to the rotor shaft (29) generated by the plastic material, the rotor being shown here with the bearings (23*a*, 23*b*) described above. This embodiment is particularly advantageous because it avoids the sticking of the magnet (35) on a yoke with problematic mechanical resistance at high temperature. It also makes it possible to increase the dynamic behavior via a lower inductance on the one hand by the absence of a ferromagnetic yoke and on the other hand by a lower inertia due to the low density of the plastic material here predominant by volume. Furthermore, in addition to simplifying the assembly of the rotor (21), which no longer requires a gluing operation, the magneto-static torque and the friction torque are reduced, as are the radial forces induced on the rotor.

Figure 25:
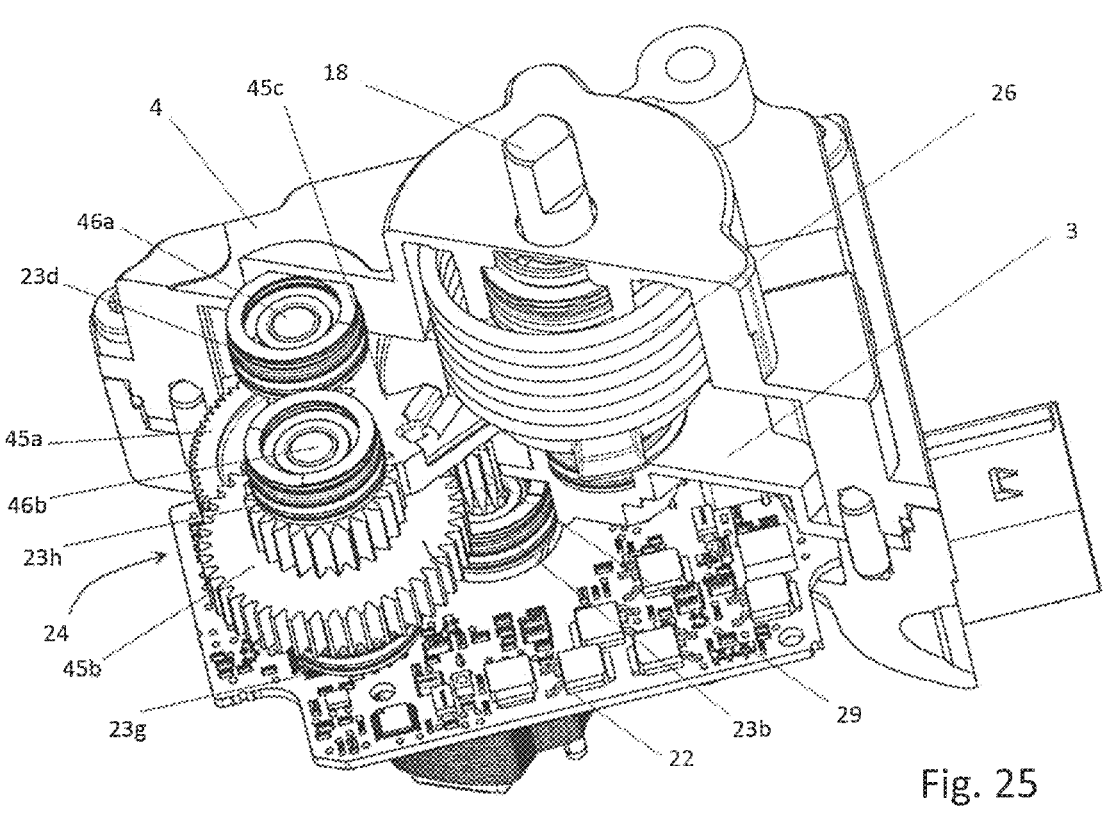

FIG. 25 is a partial sectional view illustrating the mechanical reduction gear (24). This mechanical reduction gear can be made up of several stages. The embodiments presented in the preceding figures show two reduction stages, while FIG. 25 shows three reduction stages. Indeed, the rotor shaft (29) forming a pinion at its end drives the intermediate toothed wheel (45*a*) carried by an axis (46*a*) guided by two bearings (23*g*, 23*h*), which in turn drives the toothed wheel (45*b*) carried by the axis (46*b*). The toothed wheel (45*b*) finally drives the output wheel (45*c*). As with all the embodiments presented in this text, all the axes (46*a*, 46*b*) or the output shaft (18) carrying the toothed wheels (45*a*, 45*b*, 45*c*) are on the one hand bearing on the cover (2) on one of their ends and on the other hand bearing on the intermediate plate (3) on the other of their ends.

Figure 26:
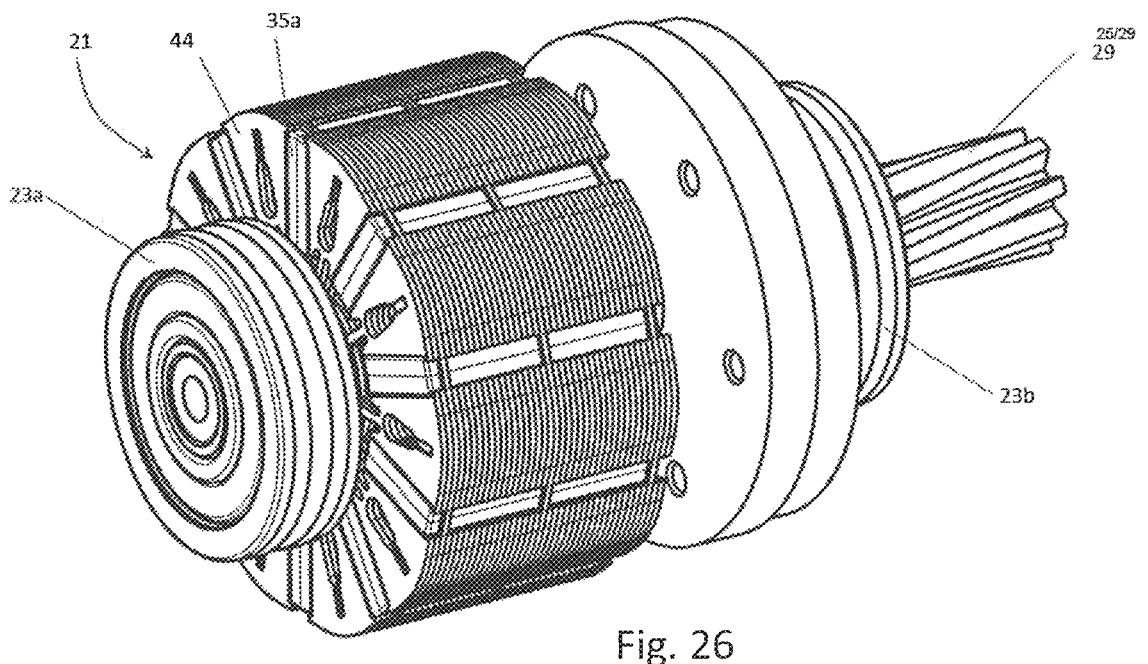

FIG. 26 shows a rotor (21) in an alternative embodiment. In the previous embodiments, this rotor (21) has a cylindrical magnet, which may or may not be carried by a ferromagnetic yoke. In this present embodiment, the rotor (21) consists of an alternation of prismatic magnets (35*a*) magnetized in a tangential direction, inserted between ferromagnetic poles (44), in a version called internal magnets of radial type ("spoke-type" embodiment). The shape of the poles (44) is pseudo-circular and designed to optimize the torque with and without current.

Figure 27:
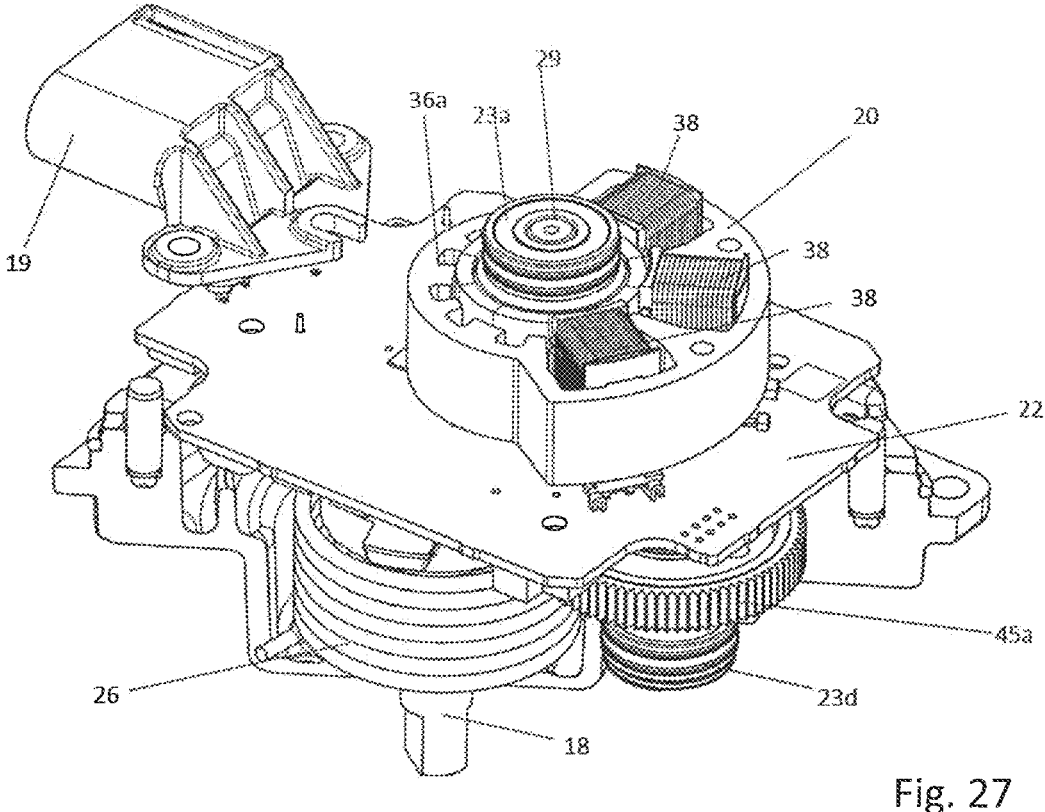
Figure 28:
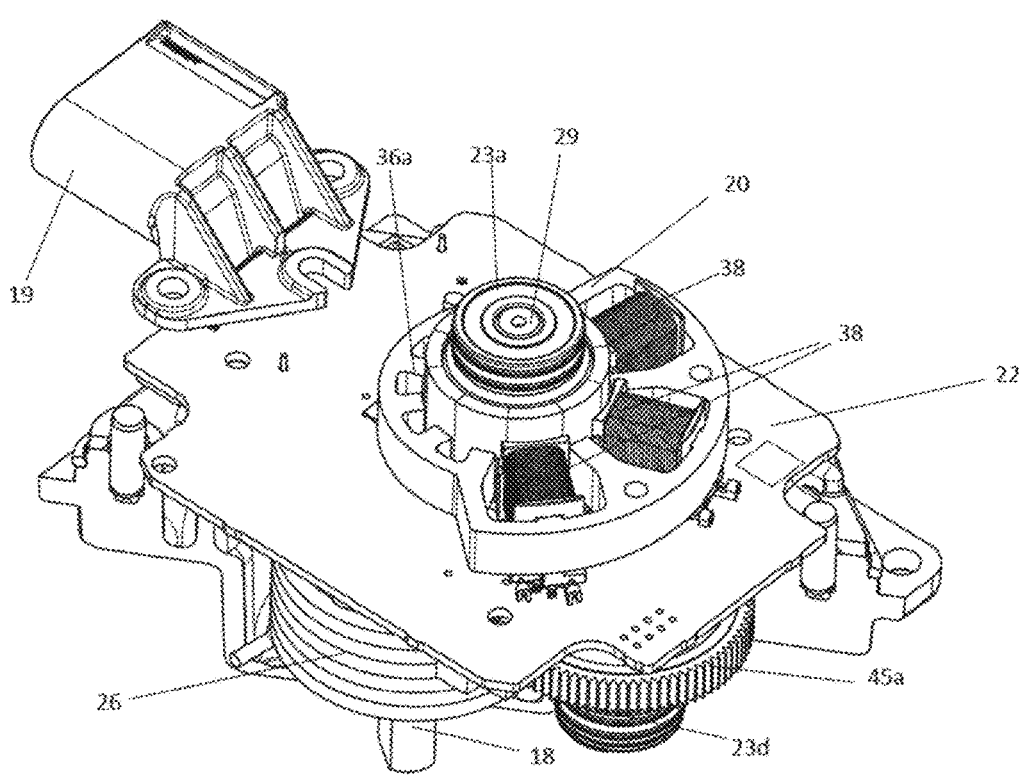

FIGS. 27 and 28 show two alternative embodiments of the stator (20) of the electric motor. In FIG. 27, the stator has three coils (38) grouped together in an angular sector close to 120° and the stator teeth (36*a*) have alternately narrow and wide angular widths as described, for example, in application FR2919441. In FIG. 28, the stator has three coils (38) grouped together in an angular sector close to 120° and the stator teeth (36*a*) have identical angular widths as described, for example, in application FR2994353.

Figure 29:
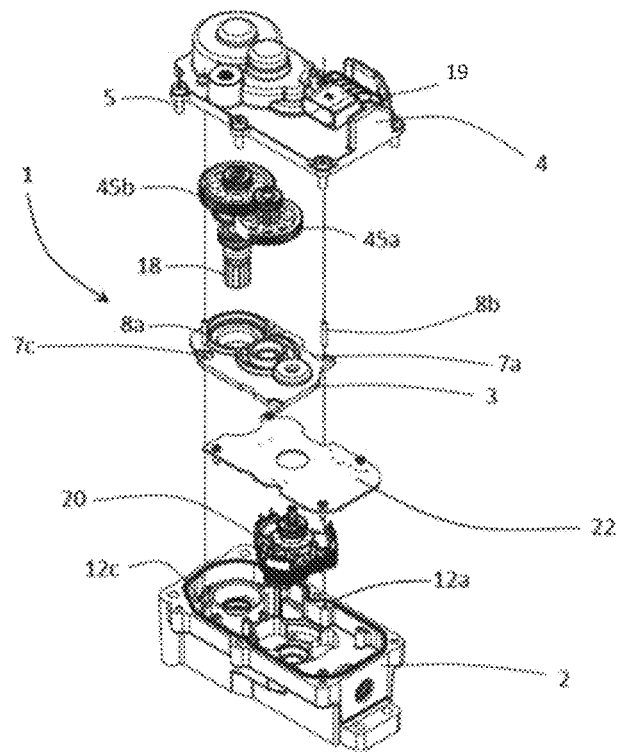
Figure 30:
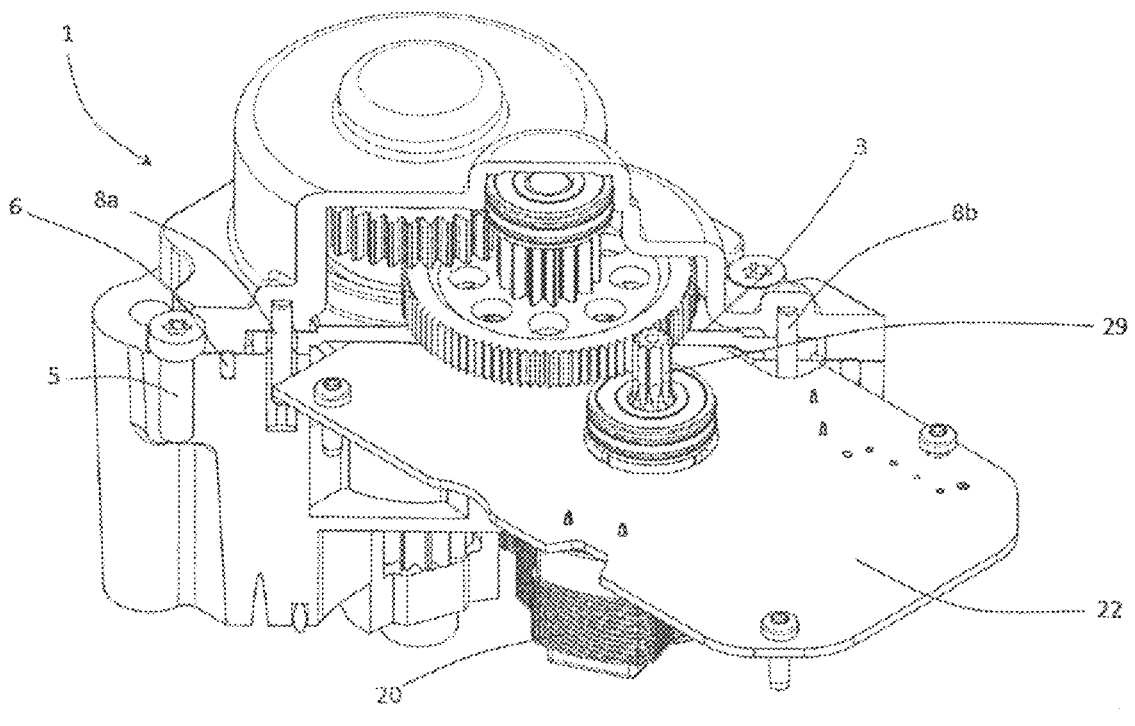

FIGS. 29 and 30 show an alternative embodiment of an actuator according to the present disclosure. The actuator (1) comprises a housing (2) receiving the stator (20) of an electric motor, a cover (4) receiving a mechanical reduction gear, an intermediate plate (3) inside the actuator (1), as well as a printed circuit (22). The centering pins (8*a*, 8*b*) allow the positioning of the housing (2), cover (4) and intermediate plate (3) with the various centering devices: two cylindrical centering devices (not visible) made with the cover (4), a clear centering device (7*c*) and a cylindrical centering device (7*a*) present at the intermediate plate (3), corresponding with, respectively, the clear (12*c*) and cylindrical (12*a*) centering devices present at the housing (2). The fixing screws (5) are intended to fix the cover (4) on the housing (2) for closing. A connector (19) is integral with the cover (4).

Positioned axially between the intermediate plate (3) and the stator (20) is the printed circuit (22), to which are connected on the one hand, and on the side of the housing (2), the electrical coils of the stator (20), and on the other hand, on the side of the cover (4), the tracks of the connector (19), in order to allow the electric power supply of the actuator (1) and the communication with the latter. The printed circuit is electrically connected with the stator winding (20) by a press-fit type connector as shown in FIG. 30. On the side of the cover (4), the printed circuit (22) is attached to the intermediate plate (3), which promotes the evacuation of heat by conduction. The intermediate plate (3) is cut in such a way that it does not cover the printed circuit at the electrical connection level.

The invention claimed is:

1. An electric actuator, comprising:
   a housing;
   an electric motor comprising a wound stator and a rotor mounted on a rotor shaft;
   a printed circuit for powering the stator and controlling the motor;
   an intermediate plate;
   a mechanical reduction gear driven by the rotor and formed by toothed wheels mounted on axes;
   a cover; and
   two centering pins;
   the housing defining a first cavity in which the stator is housed, and the housing configured to guide the rotor shaft on a first end;
   the printed circuit being housed in the first cavity above the stator;
   the intermediate plate being situated above the printed circuit;
   the cover defining a second cavity and configured to guide one end of the axes of the mechanical reduction gear, the cover being located above the intermediate plate; and
   the intermediate plate being configured to guide the other end of the rotor shaft and the other ends of the axes of the mechanical reduction gear;
   wherein,
      in the first cavity of the housing, there is a first pair of centering holes receiving the two centering pins;
      in the intermediate plate, there is a second pair of centering holes receiving the two centering pins;
      in the cover, there is a third pair of centering holes receiving the two centering pins;
      the intermediate plate is in contact with the housing and the cover solely on support surfaces located around the centering holes; and
      the housing comprises a single sealing gasket positioned at the interface between the housing and the cover.

2. The electric actuator of claim 1, wherein the housing comprises a peripheral zone having at least two first attachment bores, and the cover comprises a peripheral zone having at least two second attachment bores so that the attachment of the cover and the housing is carried out by screwing with the aid of the first and second bores, the peripheral zones not being contiguous when the cover and the housing are resting on the intermediate plate before screwing and being supported and at least partially contiguous after screwing, so as to constrain and block the movement of the intermediate plate.

3. The electric actuator of claim 1, wherein the cover forms a valve body.

4. The electric actuator of claim 1, wherein the different guide surfaces of the rotor shaft and the axes of the mechanical reduction gear are produced by the housing, the intermediate plate and the cover, the guide surfaces being ball bearings or plain bearings.

5. The electric actuator of claim 1, wherein the two centering pins and the intermediate plate form one and the same part.

6. The electric actuator of claim 1, wherein the housing is produced by overmolding a plastic material and has, on one of the holes of the pair of centering holes, two coaxial centering devices.

7. The electric actuator of claim 1, wherein the housing is produced by overmolding a plastic material and comprises a connector integrated into the overmolding.

8. The electric actuator of claim 1, wherein the printed circuit has a first face accommodating electronic components and a second face free of components, the first face facing the electric motor and at the bottom of the housing, the second face facing the intermediate plate.

9. The electric actuator of claim 8, wherein the first and second faces of the printed circuit are at least partially covered with a thermal paste, which is also at least partially in contact with, respectively, the housing and the intermediate plate.

10. The electric actuator of claim 1, wherein the wound stator has stator teeth, which are extended tangentially by magnetic field collectors at least part of the teeth carry coils and are attached to the stator, and the coils have a frustoconical shape.

11. The electric actuator of claim 10, wherein each stator tooth carrying a coil has a W shape with two adjacent teeth, and outer flanks of the frustoconical coil are parallel to inner flanks of the adjacent teeth.

12. The electric actuator of claim 10, wherein D denotes the number of stator teeth and GAP denotes the tangential distance between the field collectors between two adjacent teeth, with $$GAP = (360/(8 \times D) \pm 5\%.$$

13. The electric actuator of claim 10, wherein the rotor has a magnet, and E denotes a radial thickness of the magnet, EP1 denotes the minimum radial thickness at the end of the collector field and EP2 designates the maximum radial thickness at the start of the field collector, with $$EP2 \geq 0.75 \times E \text{ and } EP1 < EP2.$$

14. The electric actuator of claim 1, wherein the rotor comprises a permanent magnet, the permanent magnet being partially overmolded with a plastic material, the plastic material partially encompassing the rotor shaft and forming a plane orthogonal to the shaft on which a sensor magnet is positioned.

15. The electric actuator of claim 1, wherein the rotor comprises a permanent magnet, is the permanent magnet being partially overmolded with a plastic material, the plastic material partially encompassing the rotor shaft and forming a sensor magnet.

* * * * *